United States Patent
Newman et al.

(10) Patent No.: US 7,007,069 B2
(45) Date of Patent: Feb. 28, 2006

(54) METHOD AND APPARATUS FOR CLUSTERING HIERARCHICALLY RELATED INFORMATION

(75) Inventors: Paula S. Newman, Los Altos, CA (US); Francine R. Chen, Menlo Park, CA (US)

(73) Assignee: Palo Alto Research Center Inc., Palo Alto, CA (US)

( * ) Notice: Subject to any disclaimer, the term of this patent is extended or adjusted under 35 U.S.C. 154(b) by 595 days.

(21) Appl. No.: 10/321,097

(22) Filed: Dec. 16, 2002

(65) Prior Publication Data

US 2004/0117448 A1    Jun. 17, 2004

(51) Int. Cl.
*G06F 13/00*    (2006.01)

(52) U.S. Cl. ...................... 709/206; 715/514

(58) Field of Classification Search ........ 709/200–203, 709/217–220; 715/514, 517, 526
See application file for complete search history.

(56) References Cited

U.S. PATENT DOCUMENTS

| | | | | |
|---|---|---|---|---|
| 6,421,668 B1 * | 7/2002 | Yakhini et al. | ............... | 707/6 |
| 6,446,061 B1 * | 9/2002 | Doerre et al. | ............... | 707/3 |
| 6,510,436 B1 * | 1/2003 | Hart | ............... | 707/102 |
| 6,564,197 B1 * | 5/2003 | Sahami et al. | ............... | 706/55 |
| 6,816,175 B1 * | 11/2004 | Opalka et al. | ............... | 715/854 |
| 6,871,201 B1 * | 3/2005 | Yu et al. | ............... | 707/7 |

OTHER PUBLICATIONS

K. Tajima et al. "Cut as a Querying Unit for WWW, Netnews, and E-mail", Proc. 9th Annual International ACM COnf. on Hypertext, pp. 235-244, 1998.

T. Hofmann. "Probabilistic latent semantic indexing", In 22nd Annual International ACM SIGIR Conference on Research and Development in Information Retrieval, Berkeley, CA, USA, 1999.

T. Brants et al. "Topic-Based Document Segmentation with Probabilistic Latent Semantic Analysis", Proc. 11th International Conference on Information and Knowledge Management, McLean, VA, USA, Nov. 2002.

H. Ozaku et al., "Topic Search for Intelligent Network News Reader HISHO" Proc. Of the 2000 ACM Symposium on Applied Computing, Como, Italy, 2000, pp. 28-33.

M. White et al., "Selecting Sentences for Multidocument Summaries Using Randomized Local Search", Proc. of the ACL 2002 Summarization Workshop, Philadelphia, PA, USA, 2002.

(Continued)

*Primary Examiner*—Moustafa M. Meky
(74) *Attorney, Agent, or Firm*—Nola Mae McBain

(57) ABSTRACT

A method for partitioning a tree-structured discussion or other tree structured collections of texts into clusters dealing with identifiable subtopics, if such subtopics exist, or into manageable partitions if not. Each document is represented by a vector and is initially placed in a cluster containing only that document. Then a sequence of cluster combinations is performed, at each step combining the most similar two clusters, where the most similar two clusters are the clusters related by the most similar pair of document vectors, into a new cluster. The process can be halted before all clusters are combined based on application-specific criteria.

15 Claims, 32 Drawing Sheets

OTHER PUBLICATIONS

M. Sifer et al., "Zooming in one Dimension can be better than two: an Interface for Placing Search Results in Context with a Restricted Sitemap", in Proceedings of the IEEE Symposium on Visual Languages (VL '99), Tokyo, Japan, Sep. 1999.

B. Boguraev et al., "Discourse segmentation in aid of document summarization". In Proceedings of Hawaii International Conference on System Sciences (HICSS-33), Minitrack on Digital Documents Understanding, Maui, Hawaii, 2000.

D. Radev et al., Centroid-based summarization of multiple documents: sentence extraction, utility-based evaluation and user studies. In ANLP/NAACL 2000 Workshop, pp. 21-29, Apr. 2000.

B.W. Kernighan et al., "An Efficient Heuristic Procedure for Partitioning Graphs", Bell System Technical Journal, vol. 49, No. 2, pp. 291-307, 1970.

M. Sifer et al., "Structured Graphs: A Visual Formalism for Scalable Graph Based Case Tools", Australian Computer Journal, vol 28, No. 1 Feb. 1996, pp. 13-26.

* cited by examiner

Group 3: thing people sell greed buy year time difference give bike (23 msgs)
- ... Looks like I've go a winter project on my hands and I'm beginning to think I didn't underpay the lady.
- ¤...Not to accuse you of this, but one of the things that I found most unappealing about my years in classic bike collecting, restoring, showing, rebuilding was the glee with which various people I...
- ¤ I see your point. But I didn't even know what a BSA was. So before I made an offer I checked around including searching the web for an NG about bikes and posted a question... My view is not only should the buyer beware, so should the seller.

...

Group 4: market pay item worth buyer seller position prepare price (17 msgs)
- Hm. I take the view that something is worth what somebody is willing to pay for it.
- ¤ And, presumably, for what someone who has one is willing to sell it. Hmm, I think there's a name for this...
- ¤ I fully agree that the price paid for an item is its fair market value, but only when the buyer and seller are informed and willing
- I reread my statement (above) and realized it missed the point. I agree with your statement, at least in principle.

Group 3: thing people sell good buy year time difference give bike (23 msgs)
.....1 message.....
- [Summerfield1920] .. The responses I got led me to go back and buy the bike, offering an amount I could afford to throw away in case all I got was a piece of trashed junk. Now, this lady could have said to herself, I've go some motorcycles to see that I don't know anything about.
  - [Morrow] I was talking specifically about people who knew exactly what they were after and knew exactly what it was worth.... But if you know someone has inherited a motorcycle (fmstance) that is worth $5,000 and you offer then $300 because you know that they have no idea what it's worth, I believe you bring in some moral questions. ... Oh, I agree. Otoh, we both know how difficult it can be to establish market value on something like that. ... I've known some of them I don't want to ever be considered to be like them. And when I bought classic bikes (the value of which I was well aware of) in the past, I willingly paid market value for them, even it it meant educating the seller as to the true market value of the bike they were selling.
  - [Jeff] I agree. I once bought a Norton from an old-time who had owned it since new and was forced by his family to sell it. He really had no idea how much to ask, so I made him the following offer since I was just out of college and had little money. I offered him about half the going market price for his bike, and told him that when I sold the bike I'd give him everything I received over that amount, less any add-ons and maintenance incurred during my ownership. I gave him $800 for the bike, and sold it several years later for just under $1900. I'd put about $200 into it during my ownership, so I gave the man $900.
    - [Morrow] Those former acquaintances of mine that I described would thus call you a chump. Otoh, think your actions describe an honorable man.

*FIG. 4*

Focus: (subtree) (col)   Size: (++) (==)   GROUP 2   Read

| 3413. *Name1* <Q> Yes. but the "30 miles winding road" sign on the door is ostentationus | |
|---|---|
| 5576. *Name2* <Q>It refers to the 30 miles you have to go to get to the winding road. | 3429 *Name3* <Q> But accurate. My garage stretches south at least to SLO. "I have a seashell collection. I keep it on beaches all over the world. Maybe you've |
| 5589. *Name3:* <Q> I was wondering where they'd been.Much as I'd hate to attract any more people to this area, I've gotta say that nowhere in the Santa Clara valley is anyone as much as 10 miles from as much winding road as anyone could..... | |
| 5597. *Name5* <Q> I sometimes wonder whether some people drive up and down 101 all day and wonder if there are any winding roads. And then I'm glad they stay on 101. | |
| 5607. *Name6* <Q> Yes, considering how badly they drive on a straight road I'm just as glad they stay off the roads I prefer. | |

*FIG. 8*

METHOD AND APPARATUS FOR CLUSTERING HIERARCHICALLY RELATED INFORMATION

CROSS REFERENCE TO RELATED APPLICATIONS

This patent application is related to:
U.S. patent application Ser. No. 10/321,416, still pending, titled "A Method and Apparatus for Normalizing Quoting Styles in Electronic Mail", by Newman, filed concurrently herewith,
U.S. patent application Ser. No. 10/321,420, still pending, titled "A Method and Apparatus for Generating Overview Information for Hierarchically Related Information", by Newman et al. filed concurrently herewith,
U.S. patent application Ser. No. 10/321,203, titled "A Method and Apparatus for Generating Summary Information for Hierarchically Related Information", by Blitzer filed concurrently herewith, still pending,
U.S. patent application Ser. No. 10/320,911, titled "Method and Apparatus for Displaying Hierarchical Information", by Newman filed concurrently herewith, still pending and
U.S. patent application Ser. No. 10/320,930, titled "Method and Apparatus for Segmenting Hierarchical Information for Display Purposes", by Newman filed concurrently herewith, still pending.

INCORPORATION BY REFERENCE

The following patents and/or patent applications are herein incorporated by reference:
U.S. patent application Ser. No. 09/732,024, titled "Method and System for Presenting Email Threads as Semi-connected Text by Removing Redundant Material", by Paula Newman and Michelle Baldonado, filed Dec. 8, 2000, still pending.
U.S. patent application Ser. No. 09/732,029, titled "Method and System for Display of Electronic Mail, by Paula Newman, filed Dec. 8, 2000, still pending,
U.S. patent application Ser. No. 09/954,388, titled "Method and Apparatus for the Construction and use of Table-like visualizations of Hierarchic Material, by Paula Newman and Stuart Card, filed Sep. 10, 2001, still pending,
U.S. patent application Ser. No. 09/954,530, titled "Method and Apparatus for the Viewing and Exploration of the Content of Hierarchical Information, by Paula Newman and Stuart Card, filed Sep. 10, 2001, now U.S. Pat. No. 6,944,818.
U.S. patent application Ser. No. 09/717,278, titled "Systems and Methods for Performing Sender-Independent Managing of Electronic Messages, by Michelle Baldonado, Paula Newman, and William Janssen, filed Nov. 22, 2000, still pending,
U.S. patent application Ser. No. 09/732,028 titled "Method and System for presenting semi-linear hierarchy displays" by Paula Newman, filed Dec. 8, 2000, now U.S. Pat. No. 6,683,632,
U.S. patent application Ser. No. 09/747,634, titled "System and Method for Browsing Node-Link Structures Based on Estimated Degree of Interest", filed on Dec. 21, 2000 by Stuart Card, now U.S. Pat. No. 6,944,830,
U.S. patent application Ser. No. 10/103,053, titled "Systems and Methods for Determining the Topic Structure of a Portion of a Text" by Ioannis Tsochantaridis, Thorsten Brants, and Francine Chen, filed Mar. 2, 2002, still pending,
U.S. patent application Ser. No. 10/164,587, titled "Authoring Tools, Including Content-Driven Treetables for Fluid Text" by Polle Zellweger, Paula Newman, and Maribeth Back, still pending.

BACKGROUND

The present invention relates generally to the field of information analysis and display. More specifically, it provides methods for partitioning tree-structured textual material into topically related clusters of adjacent items, then developing digests of each cluster. The digests include both shorter overviews and arbitrarily long summaries. The tree-structured material involved could be for example, but is not limited to, trees containing the messages and postings of an archived discussion within a newsgroup, discussion list, or on-line forum. This invention also provides methods for partitioning a two-dimensional tree visualization, called a treetable, into conveniently sized segments for detailed exploration. The segments may be grouped into regions corresponding to the topically related clusters.

To establish some terminology, a "tree" or "tree structure" is a standard term denoting an abstract data structure that models information as a set of nodes connected by directed edges such that: (a) there is exactly one element having no incoming edges, called the "root"; and (b) all other nodes have exactly one incoming edge. A leaf node is a node with no outgoing edges. All nodes besides the root node and the leaf nodes can be called "interior nodes". The "parent" of a node is the source of its incoming edge, and the "children" of a node are the targets of its outgoing edges. A "subtree" of a tree is a set of nodes consisting of a "subtree root" node that has no parent in the subtree, and other nodes all having parents in the subtree.

The present invention is intended for use in connection with tree structures whose interior nodes represent substantial amounts of logically related textual information. For example, in the tree-structures formed by archived discussions, the nodes represent individual messages or contributions, and a message represented by a child node is a response to the message represented by its parent. The creation of the parent-child links in archived discussions can be established by a combination of conventional means utilizing header information, and deeper means, as described in U.S. patent application Ser. No. 09/732,024, still pending, titled "Method and System for Presenting Email Threads as Semi-connected Text by Removing Redundant Material", by Paula Newman and Michelle Baldonado, incorporated by reference hereinabove.

Tree-structured archived discussions on a particular subject are usually represented for exploration by indented lists. Each contribution is represented by some identification information, such as contributor name and date, indented under the identification information for its parent. The individual contributions may then be accessed for reading by selecting one of the list items. However, archived discussions pay varying amounts of attention to the ostensible subject and initial contribution, and often branch into several subtopics, so the reader cannot assume, based only on the ostensible subject, whether any portion of the discussion is actually of interest, and, if so, what parts of the discussion. A more informative representation of the overall content of an archived discussion is described in U.S. patent application Ser. No. 09/732,029, still pending, titled "Method and System for Display of Electronic Mail, by Paula Newman, incorporated by reference hereinabove. In that representation, initial substantive fragments of each contribution, containing actual text of the message rather than quotes or quote introduction, are embedded within a reduced-width linear tree tailored to text embedding. This representation is suitable as a level of presentation of the discussion, and also as the content of an emailed digest summarizing activity in the discussion list, or as a client side digest of such activity. Client-side accumulation of email from discussion lists, involving concatenating, or sampling, messages from all mail received in a particular period, is introduced in U.S. patent application Ser. No. 09/717,278, still pending, titled "Systems and Methods for Performing Sender-Independent Managing of Electronic Messages, by Michelle Baldonado, Paula Newman, and William Janssen, incorporated by reference hereinabove.

Yet another method of representing the overall content of an archived discussion is described in U.S. patent application Ser. No. 09/954,388, still pending, titled "Method and Apparatus for the Construction and use of Table-like visualizations of Hierarchic Material, by Paula Newman and Stuart Card, and U.S. patent application Ser. No. 09/954,530, now U.S. Pat. No. 6,944,818, titled "Method and Apparatus for the Viewing and Exploration of the Content of Hierarchical Information, by Paula Newman and Stuart Card, both incorporated by reference hereinabove. In this method, the conversation tree is presented in a two dimensional tabular form called a "treetable". In such a treetable, each cell represents a single node and exactly spans the cells representing its children if any, and a substantive initial fragment of the message associated with the node is displayed in the cell, to the extent that space allows. The individual columns and subtrees of the treatable may be selected for expansion (reducing other parts of the tree), to view more of the associated texts, and the full texts of each column may be selected for display in auxiliary windows or frames. (Note that a similar representation is described in an article entitled "Structured Graphs: a visualization for scalable graph-based case tools" by M. Sifer and J. Potter, in the Australian Computer Journal, Volume 28 Number 1, and also in later papers authored by M. Sifer and other colleagues, but in these references the potential of the structure is not exploited for purposes of exploring trees whose nodes have associated significant text.)

While the latter two methods (reduced-width linear trees and treetables) with embedded initial fragments are useful methods of providing overviews for smaller discussions and other tree-structured textual material, they are less useful for larger discussions. For example, for a stored conversation consisting of 93 messages, a reduced-width linear tree containing initial fragments requires over 11 standard-size display windows. Alternatively, if such a conversation is represented in a treetable that can be contained in a single window, the cells are too small to contain any indicative content, and there are too many columns to expand individually to determine if there is content of interest.

Therefore, more accessible digests of such larger discussions are needed. Current approaches to text processing address some related problems. Methods have been developed for segmenting individual documents into extents dealing with different approximate subtopics, and for identifying the topics covered by the most indicative words, as described in U.S. patent application Ser. No. 10/103,053, still pending, titled "Systems and Methods for Determining the Topic Structure of Portion of a Text" by Ioannis Tsochantaridis, Thorsten Brants, and Francine Chen, incorporated by reference hereinabove. Methods have also be developed for summarizing identified topic extents by collections of extracted sentences, and for associating summary elements with the text extents covered, as described, for example, in a paper by Branimir Boguraev and Mary Neff entitled "Discourse Segmentation in Aid of Document Summarization", in the Proceedings of the Hawaii International Conference on System Sciences (2000). Methods have also been developed for summarizing collections of separate documents by grouping them by topic, generally using centroid-based clustering methods, and then extracting sentences dealing with each topic. An example of such an approach is described by Dragomir Radev, Hongyan Jing, and Malgorzata Budzikowska in the paper "Centroid-based summarization of multiple documents: sentence extraction" in the *Proceedings of the ANLP/NAACL* 2000 *Workshop on Automatic Summarization* (Seattle, Wash., April 2000) pages 21–29. However, tree-structured discussions are neither single documents nor collections of independent documents, and specialized methods are needed for their segmentation and summarization.

Two limited approaches seem to have been developed, to date, relating to segmenting tree-structured discussions, but none, as far as can be ascertained at this time, to summarizing those discussions. A paper by K. Tajima, Y. Mizuuchi, M. Kitagawa, and K. Tanaka entitled "Cut as a querying unit for WWW, Netnews, and E-mail", in the Proceedings of the $9^{th}$ ACM Conference on Hypertext and Hypermedia (1998) descries a method for identifying overlapping subtrees of a discussion as units of information retrieval, to put retrieved messages into a useful context. The clustering method processes the thread tree bottom-up and, at each step, combines a parent with currently open child subtrees, separately or together, if the similarity between the parent word vector and the centroid vector of the child subtree or subtrees exceeds an (unspecified) absolute input threshold. The word vectors used to represent the vectors handle quoted passages by reducing the weights of quoted words, in order to keep inter-message distances from being too small. While no results are given, if the threshold is set relatively high, this method would probably lead to shallow subtrees, suitable as query results. However, it is unlikely that the method would lead to clustering results suitable for subtopic identification or digesting. Based on our experiments, quoted words require more detailed treatment, and some trials of a similar single-link clustering method using distances between a node and the centroid of an adjacent cluster produced unsatisfactory results.

Another approach related to discussion tree segmentation is described in a paper by H. Ozaku, K. Uchimoto, M. Murata, and H. Isahara entitled "Topic Search for Intelligent Network News Reader HISHO", in the Proceedings of the 2000 ACM Symposium on Applied Computing. This paper describes a method for retrieving many discussions relating to a query topic, and then attempting to filter out discussion subtrees irrelevant to the topic. The method uses, for the most part, noun keywords to represent messages, and tries to find "topic changing articles" where the proportion of never-seen-keywords shifts, and "topic branching articles" where a message gives rise to several responses distinguished by their keyword usage and their referenced quotes. This strategy is reported as of limited success in finding topic-changing articles (recall=57%) and larger success in finding topic branching articles.

The present invention incorporates methods of dividing a tree-structured discussion into major subtopics, and of developing digests containing segments for each such subtopic. Two types of digests are developed, that may be inspected in sequence. Shorter digests, which we will call "overviews", choose a set of texts in each subtopic based on topic-relevance and potential for providing coherent sequences, and represent each such text by one or more extracted sentences. Potentially longer digests, which we will call "summaries", choose a set of extracted sentences representing a proportion of the text associated with a subtopic, by a combination of features resting on inherent properties of the sentences, and on the content of a developing summary.

The present invention also provides methods for pre-segmenting a large tree or treetable for purposes of visualization and deeper exploration of individual nodes, with the segments sized so as to allow inclusion of at least some amount of content-indicative text for each node. There have been many approaches developed to allow investigation of detailed areas of large visualizations, usually distinguished as either "fisheye" approaches, that expand part of visualization at the expense of other parts, or "focus plus context" approaches that extract and expand part of visualization into another window. Some examples of these approaches as applied to trees and treetables are: (a) in-situ expansions of nodes in the neighborhood of a selected node within a "Degree of Interest Tree", described in U.S. patent application Ser. No. 09/747,634, now U.S. Pat. No. 6,944,830, titled "System and Method for Browsing Node-Link Structures Based on Estimated Degree of Interest, by Stuart Card, incorporated by reference hereinabove, (b) in-situ expansion of treetable columns and complete subtrees (all nodes descended from a given node, and extraction of sets of columns and complete subtrees into another window, as described in U.S. patent application Ser. No. 09/954,388, still pending titled "Method and Apparatus for the Construction and use of Table-like visualizations of Hierarchic Material, by Paula Newman and Stuart Card, incorporated by reference hereinabove, and (c) iterative restriction of the display to subtrees or user-defined sets of nodes, is provided in a treetable-like visualization described in the papers "The SGF metadata framework and its support for social awareness on the World Wide Web", by O. Liechti et.al. in World Wide Web (Baltzer), 1999. 2(4., and "M. Sifer and O. Liechti, "Zooming in One Dimension Can Be Better Than Two: An Interface for Placing Search Results in Context with a Restricted Sitemap" by M. Sifer and O. Liechti, In Proceedings of the 1999 IEEE Symposium on Visual Languages (Tokyo, Japan) 72–79.

These methods all have some problems when used in connection with large trees. In-situ expansion of neighborhoods, columns, or subtrees can be disorienting when the expanded nodes are to contain significant amounts of text, because the shape of the tree changes dramatically, and little space is left for unexpanded nodes. Also, for large trees, subtree extraction (or restriction of the display to a subtree) tends to be an iterative process. This may be suitable when the tree represents a generalization hierarchy, so that higher level nodes provide good cues as to the content of lower level ones, but not otherwise, for example when the trees represent discussions, or the network of linked nodes on a website, reduced to a tree by removing cyclic paths. Finally, leaving the specification of sets of nodes to be extracted to users is problematic both because it is laborious, and because successive extractions are still generally needed to make sufficient node-identification information visible to permit an intelligent selection.

For this reason, the methods provided in this invention pre-partition a tree or treetable into segments of related nodes whose approximate maximum dimension permits significant text to be presented for each node. The segments can be visually differentiated in an outline depiction of the tree or treetable as a whole, and individual segments then extracted for deeper exploration. The segments may also be constrained to represent only nodes within the same logical grouping, which may be an identified subtopic, or collection of less-focused material, or other type of grouping. When the segments are so constrained, regions of adjacent segments associated with each such grouping can also be visually differentiated from other such regions.

The method for partitioning is related to, but different from, the large body of work on partitioning graphs (collections of nodes linked by edges, but not necessarily hierarchic) into a roughly equal-size subgraphs, given either the number of subgraphs to be found or a maximum size per subgraph, and possibly some additional constraints on the subgraphs, with the purpose being to minimize the number of edges between subgraphs. Much of the work derives from an algorithm described by B. W. Kernighan and S. Lin in the paper "An efficient heuristic procedure for partitioning graphs", in *The Bell System Technical Journal,* 49(2) 1970, in which a greedy algorithm obtains an initial partitioning, and then nodes are iteratively moved among subgraphs to improve the quality of the partition. Such methods have applications in VLSI design, distribution of processes and data among processors, and sparse matrix representations. The problem addressed by the methods of the present invention is different, in that the permissible subgraphs are far more constrained; subgraphs must represent either subtrees or sets of subtrees whose roots have a common parent (and sometimes are part of the same logical grouping), and must largely respect a given layout dimensionality. This, in turn, permits the careful initial partitioning algorithm described in this invention to be sufficient to the purpose.

Further advantages of the invention will become apparent as the following description proceeds.

SUMMARY OF THE INVENTION

Briefly stated and in accordance with the present invention, there is provided a method for partitioning a tree-structured discussion or other tree structured collections of texts into clusters dealing with identifiable subtopics, if such subtopics exist, or into manageable partitions if not. The partitioning method uses a variant of a standard method of agglomerative, single link ("nearest neighbor") clustering described by G. Salton in Automatic Text Processing, Addison Wesley (1989). In that method, each document is represented by a vector containing one position for each unique word to be taken into account in the combined texts, and is initially placed in a cluster containing only that document. Then a sequence of cluster combinations is performed, at each step combining the most similar two clusters, where the most similar two clusters are the clusters related by the most similar pair of document vectors, into a new cluster. The process can be halted before all clusters are combined based on application-specific criteria. In the partitioning method of this invention, the vector positions for a particular node are generally also filled in well known ways, namely, by "stemming" the words of the associated text, to lemma (root word) forms, and ignoring words occurring in a "stop list" of very common words, and representing each word by a tf.idf weighted frequency (a weighting of a term frequency tf by the "inverse document frequency" idf, which is basically the quotient of the number of documents in a collection divided by the number of documents in which the word appears, thus giving preference to words occurring less frequently in the collection, and has many variations, also described by Salton in Automatic Text Processing. Addison Wesley (1989) The word vectors can also optionally be converted into vectors reflecting some semantic relationships, by methods such as Probabilistic Latent Semantic analysis (PLSA), as described by Thomas Hofmann in the paper titled "Probabilistic Latent Semantic Indexing", in Proceedings of SIGIR '99 (Berkeley, Calif., August 1999) 50–57.

However, the clustering method is unique to grouping tree-structured texts, especially message texts, both in processing that occurs before constructing word vectors, and within the clustering process proper. In this invention, before constructing the word vector for a node, a) First, the node-associated message is analyzed into its essential text, plus inessential material such as entire prefixed or suffixed prior messages and their introductory material, and contact information, using methods described in U.S. patent application Ser. No. 09/732,024, still pending, titled "Method and System for Presenting Email Threads as Semi-connected Text by Removing Redundant Material", by Paula Newman and Michelle Baldonado, incorporated by reference hereinabove.

b) Then, the essential text of the node-associated message is adjusted to avoid vector distance distortions based on differences in quoting styles. Initially, selective quotes (that is, quotes that represent only part of the message associated with the parent) are included, as these are reasonably considered to form a logical part of the message, and entire prefixed or suffixed messages are omitted as playing an indeterminate role.

c) Finally, if the message does not contain selective quotes, an analysis is done to determine whether all or part of the parent message constitutes a logical, albeit implicit, references. If so, all or some parts of the essential text of the parent are included in the adjusted message. In the current embodiment, the analysis determines that the message contains an implicit reference to the parent message if both messages are sufficiently short that it is likely that they both discuss a single issue, and, since the message is a response to the parent message, that it is likely to be the same issue. The word vector for the node is then constructed from the adjusted message.

It should be noted that this type of message adjustment is also suitable for use in representing message content for other applications, for example, in finding messages dealing with a particular topic, or finding inter-conversation topic groupings via centroid-based clustering methods.

The other divergences from standard clustering practice are within the clustering process proper. First, the inter-node relationships considered in the single-link clustering are restricted to parent-child and sibling relationships within the tree, so that a cluster consists either of a subtree, or of several subtrees whose roots have a common parent external to the cluster. Second, the final clusters used for summary purposes are isolated in the following tree-specific ways:

a) The root of the tree may be held out from the clustering process to avoid relating otherwise unrelated children. After clustering is completed, the root is combined with the cluster containing the most lexically similar children.

b) Cluster similarity may take into account additional factors besides linking by the most similar pair of document vectors c) Clustering for purposes of identifying groupings to be represented in the digests halts in one of the following circumstances, whichever occurs first:

i. When a cluster is about to be formed whose size exceeds a particular function of the total number of nodes. The combined cluster may or may not then be formed depending on a possibly larger maximum size that is also a function of the total number of nodes. This halting point is adopted based on observing conversation structures within some discussion lists; there is usually one topic that occupies a considerable part of the discussion, whose size tends to be proportionate to the size of the discussion as a whole, and there are also, frequently, one or more digressions of some importance that are smaller in size.

ii. When the distance between the two nodes representing the clustering link is large relative to the maximum of the parent-child and sibling distances (e.g., 75% of the maximum distance).

After clustering for digesting purposes is halted, clusters are selected that probably represent subtopics and are closed to further combination. The selection may be based on a function of the number of nodes in the cluster and in the tree as a whole. Not all such clusters may actually be represented in a displayed digest, which may further select among the subtopic-associated clusters based on absolute and tree-relative cluster size and other factors such as average text lengths. Clustering then continues to obtain secondary clusters that form less-closely related "collections", which can also be reflected as regions within a partitioned treetable. The results of such a clustering, as reflected in a segmented treetable, are shown in FIG. 4, discussed hereinbelow.

Two methods are also provided for digesting the content of individual clusters. One method, which obtains relatively short overviews, selects a proportion of representative nodes from the cluster, and then extracts and organizes one or more sentences from the text associated with each selected node. For text trees representing archived discussions, the basic intuition underlying the selection of nodes and sentences is that comment/response sequences drawn from lexically central nodes will capture those aspects of the discussion considered most important to discussion participants.

The nodes are selected based on their centrality to all or part of the cluster, and also for their potential for providing some degree of fluency in reading. They comprise central nodes and auxiliary nodes. Central nodes comprise a) One or more nodes whose word vectors are closest to the lexical centroid of the entire cluster (the average of the word vectors for all nodes in the cluster), and b) One or more nodes each of which has an associated word vector which is central to a subcluster larger than a given minimum size found during the cluster process and later combined with another cluster.

We note that central nodes derived their lexical centrality both from a their inherent content and from their incorporated quotes. The total number of nodes used as central nodes is determined by an input parameter.

Auxiliary nodes are generally non-central nodes that are parents of central nodes or parents having more than a given number of children. It is from these nodes that passages quoted in central nodes, or in many nodes, will be drawn; thus auxiliary nodes both fulfill the coverage potential of their more central children, as well as supplying continuity. For some clusters, specifically those containing or descending from the root of the entire conversation, auxiliary nodes may also include the root text and a proportion of its children. This allows the overview to be more informative with respect to what is generally the most important topic of the discussion.

The total number of nodes represented in the overview is determined by the number of central nodes selected, and the number of auxiliary nodes added for any of the reasons given above.

After nodes are selected to represent a cluster, sentences are extracted from their associated texts for use in the overview so as to provide coherent comment/response sequences. The sentences extracted depend on the whether the node is a central node or an auxiliary node. For all selected nodes, if the associated text been has been quoted, sentences are extracted that correspond to the most germane quote (or quotes, depending on an input parameter) in each of the texts associated with each of its child nodes. In the current embodiment, a germane quote is a quote preceding a relatively long non-quoted sequence. Also, a) For an auxiliary node, if it has not been quoted, the final sentence is extracted.

b) For a central node, an additional sentence or sentences are extracted. If the node-associated text contains selective quotes, the individual sentences following its most germane quote or quotes (as discussed above) are extracted. However, if the node-associated text does not contain selective quotes, an initial sentence or a sentence that is lexically central to the node-associated text is extracted.

If an extracted sentence is very short it is extended with additional text material, using material to the left if it is a quoted sentence, and to the right if not.

After sentences are extracted to represent a node they are sorted based on their position in the text associated with a node, duplicates are eliminated, and the remaining sentences are concatenated into a string representing the node in the overview, with intervening gap indicators such as ellipsis symbols " . . . " to represent sentences in the text not included in the overview. These strings are then arranged in the tree order of the cluster to form the cluster overview, using either a reduced width tree, such as shown in FIGS. 1 and 2, representing a completed overview for a discussion, or an indented tree, such as shown in FIG. 3, representing the part of the summary (see below) associated with group 3 of the same discussion. In both cases, the cluster overview may be prefaced with a list of the most frequent words occurring in the cluster, that serve to further illustrate the concerns of the cluster. The word lists are obtained by standard methods, e.g., by adding the idf-weighted word-vectors obtained for each text within the cluster and then selecting the words having the largest value in the resultant sum vector.

Another cluster digesting method is also provided that can obtain longer, more readable, and more informative summaries of clusters whose contained texts are well focused and longer. This method selects a percentage of the sentences associated with nodes in the cluster, in the current embodiment 10%, or, or, to accommodate to clusters containing many short texts, a percentage of the nodes in the cluster, in the current embodiment 60%, whichever number is larger, to obtain reasonably sized, informative summaries. The sentences are selected from the cluster as a whole using a staged, feature based method that builds on methods well known to practitioners of the art, such as the methods described by M. White, and C. Cardie, C. in the paper "Selecting sentences for multi-document summaries using randomized local search", in the *Proceedings of ACL 2002 Summarization Workshop* (Philadelphia, Pa., July 2002).

However, many of the features used, and the specifics of the staging, are specific to obtaining coherent summaries of tree-structured discussions.

The method initially assigns an intrinsic score to each sentence based on its lexical centrality in the cluster, its ordinal position in its containing text, and the number of nodes in the tree descended from the node associated with that text in the tree, and chooses the sentence with the best intrinsic score as the first sentence to be included in the summary. Then the process iterates until the desired number of summary sentences is found. In each iteration, each not-yet-chosen sentence is given an extract score that modifies its intrinsic score by features concerned with the relationship of the sentence to sentences already in the extract, and the sentence with the highest extract score is added to the summary. The conventional features used to form the extract score measure the adjacency of the sentence being tested to sentences already in the summary (adjacency being desirable), and the redundancy of the sentence with sentences in the summary (redundancy being undesirable). The discussion specific features used in the process test whether the sentence is from a node that is a parent or child of a node already represented in the summary, and whether the sentence is quoted immediately before a sentence in the summary, or immediately follows a quote of a sentence represented in the summary. After the summary sentences are chosen by this method, they are organized in the same way as sentences in the overview, as described above A method is also provided for dividing a tree of texts into segments for purposes of visualization within a display window or frame, with each segment either a subtree or a set of subtrees whose roots have the same parent external to the segment, and each segment sized such that extracting a visualization of the segment into another window or frame permits significant text to be associated with each node in the segment. The segments may also be constrained to be associated with the same logical grouping of nodes, which may be a cluster obtained by the method described hereinabove, or some other logical grouping, such as the set of nodes associated with a given time period.

The division of the tree into segments may be obtained by a method that operates bottom up within the tree. A desirable maximum width and height is set for segments. Then for each node in the tree, starting with the leaves and not processing a node until all of its children have been processed, the method proceeds as follows:

(a) First, if the current node has any children (i.e., if it is not a leaf), and if nodes within a segment are constrained to belong to the same logical grouping, then close any currently open segments headed by children of the current node that do not belong to the same logical grouping as the current node, while combining segments in the same logical grouping if the result does not exceed the maximum segment width. In combining segments, try to obtain segments that are roughly equal in width.

(b) Then, if the current node has any remaining children heading open segments, compute the current width of a prospective new segment that would result from combining all of the remaining children heading open segments into one segment. This is the width that would be required to allocate a substantially sized space to each node of the portion of the tree or treetable represented by the segment (where it is assumed if a classic "node+edge" tree visualization were used, subtrees would be vertically separated) plus, if desired, some space to represent closed segments containing children of the current node as single cells (to provide more context to the visualization). The current width is computed by adding the widths of the currently open segments headed by its children, plus, if desired, proportion of the count of the closed segments containing its children. If the current width, so computed, exceeds the maximum desired segment width, try to combine and close enough open segments headed by its children to reduce the current width so that it is as large as possible without exceeding the maximum segment width. Note that if counting a proportion of closed segments containing its children itself exceeds the maximum segment width, then exceeding the maximum segment width cannot be avoided. In combining open child segments, try to obtain segments that are roughly equal in width.

(c) Finally, create a new open segment by combining the current node with the currently open segments headed by its children, if any. If the current node has no children, the width of the resulting new segment is 1. If the current node has children, the width of the resulting new segment is the current width, as defined above. If the width of the new open segment reaches or exceeds a maximum desired dimension, close it unless doing so would foster some very small segments. Two such cases are (1) where the desired maximum height dimension has been reached and there are very few nodes in the same logical grouping above the current one in the tree, and (2) where the width dimension has been reached, and the current node has siblings in the same logical grouping. In the latter case the decision of whether to close the current segment is left to the processing of the immediate parent node.

Companion methods are also provided to visualize and explore the result of the segmentation. The visualizations place a two dimensional representation of the full tree in either a classic "node plus edge" representation, or a treetable representation, in one window or frame, and a representation of a selected segment in another window or frame. The visualization of the full tree may take one of several forms. It may be an outline treatable in which all cells are represented. In that case, the segments, as well as collections of adjacent segments within the same logical grouping, which we will call regions, can be visually differentiated as shown in FIG. 6, by visually separating regions, and differentiating segments within the same region by heavy outlining and or different cell backgrounds. Alternatively, the visualization of the full tree may be in the form of an abstracted segmented tree or treetable in which entire segments are represented as nodes, visually grouped into regions, and represented as a standard treetable, or a classic "node+edge" tree representation, or as a content-driven treetable as described in U.S. patent application Ser. No. 10/164,587, titled "Authoring Tools Including, Content-Driven Treetables for Fluid Text" by Polle Zellweger, Paula Newman, and Maribeth Back (D/A2017) incorporated by reference hereinabove.

BRIEF DESCRIPTION OF THE DRAWINGS

FIG. 3 is the third part of an overview of a 93-message discussion

FIG. 4 is the summary equivalent of the overview of group 3 of FIG. 3.

FIG. 8 illustrates a treetable for a single segment

DETAILED DESCRIPTION OF THE INVENTION

Turning now to the figures, this embodiment of the invention presents a discussion list review tool using overviews, summaries, and segmented treetable visualizations for the exploration of long discussions. FIGS. 1 through 4 illustrate some summary and overview material produced by the methods making up the invention. The texts underlying these figures represent messages of the Usenet rec.motorcycles newsgroup. FIGS. 5 through 9 illustrate aspects of the segmented treetable visualization. The visualizations are obtained by submitting display specifications to a display processor. In this case an Internet Explorer browser was utilized. However, the methods of the invention can be used to create specifications for many kinds of display processors, such as those embedded within graphic user interface (GUI) toolkits associated with many programming languages. FIGS. 9 through 28 illustrate the methods used to develop the overview, summary, and segmented treetable outputs.

It should also be noted that although this particular embodiment is directed to a review tool for a stored discussion, the methods of this invention could be used, in whole or in part, to analyze and present other types of tree structured texts, in particular the content of tree-structured websites, and other tree-structured hypertext documents.

Figure 1:
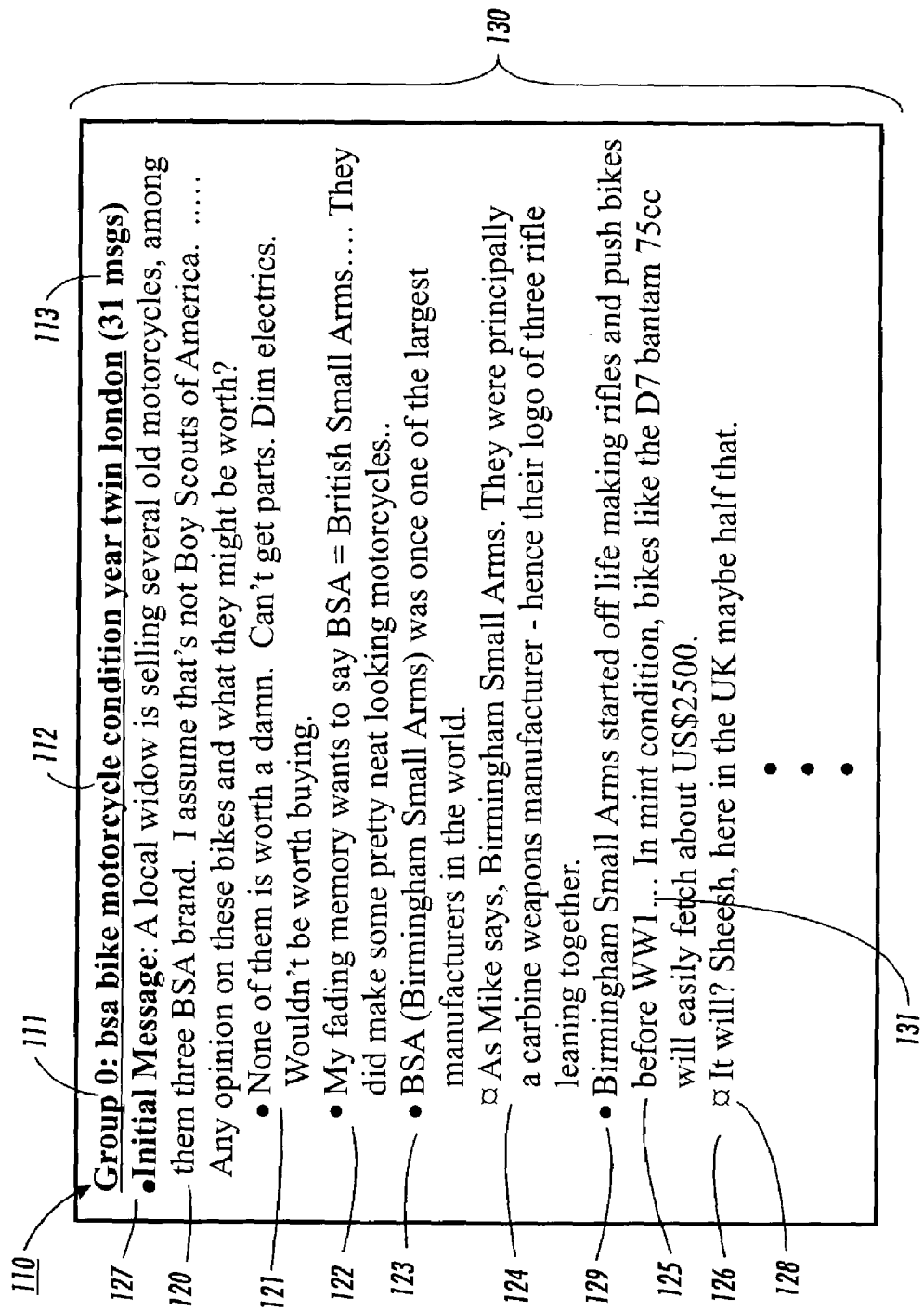
FIG. 1 is a the first part of an overview of a 93-message discussion
Figure 2:
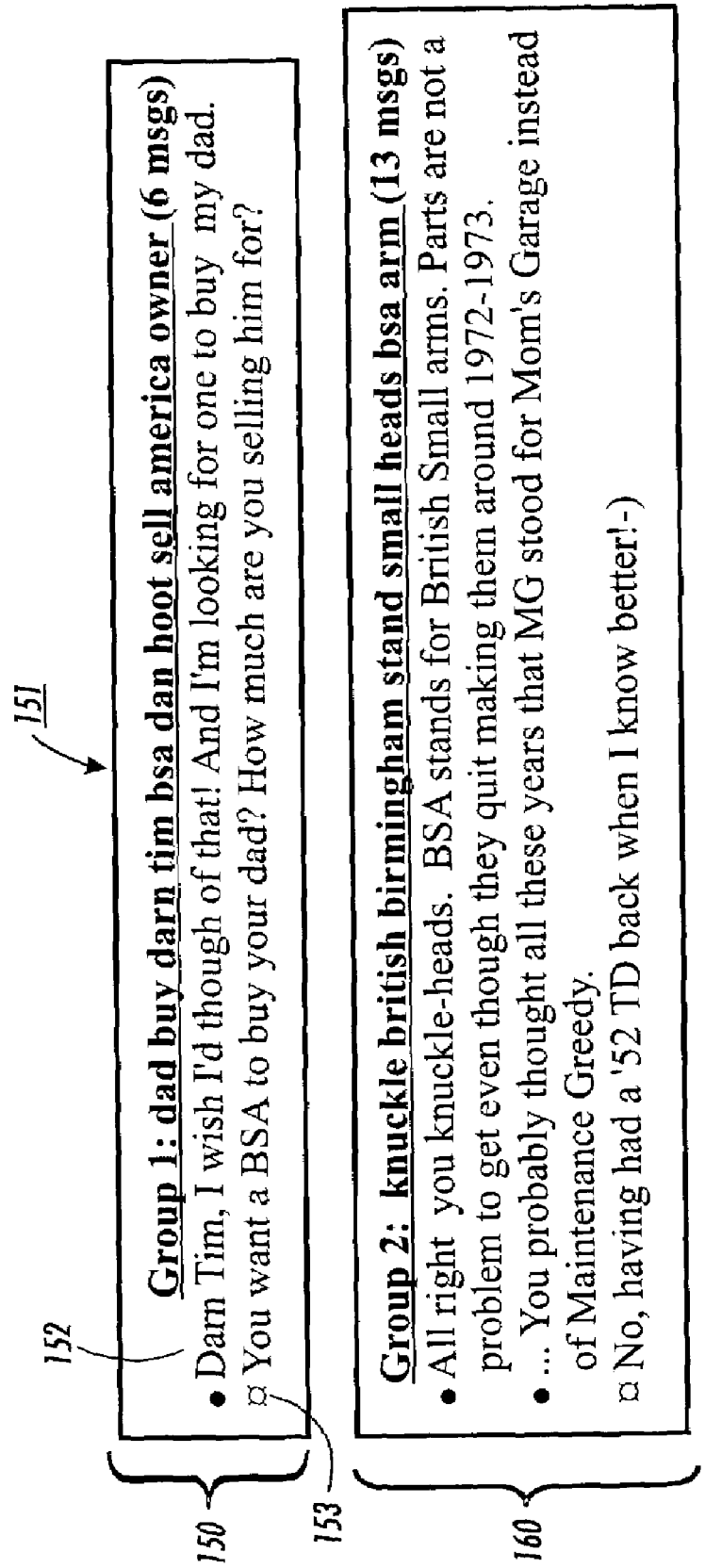
FIG. 2 is the second part of an overview of a 93-message discussion.

FIGS. 1, 2, and 3 depict portions of an overview obtained by the methods described in this invention, in this case for a tree representing a 93-message discussion whose subject line is "What's a BSA". The full overview occupies, by scrolling, approximately 2 pages. FIG. 1 shows the first part, of the overview, which contains only group overview 130, comprising the part of the overview devoted to the first major subtopic group of the discussion found by the clustering procedure of this invention. The group represented by group overview 130 contains the node, associated with the initial message, which inquires as to the meaning of the brand name BSA, the value of the motorcycles, and the availability of parts. The group also contains nodes associated with those messages in the discussion that deal fairly directly with issues raised in the initial message. The overview for this group is relatively long, obtained using an option that gives additional representation in the overviews to the root node of a tree and its children. For stored discussions, this provides more coverage to messages that often contain the most useful information for a casual reader.

Figure 5:
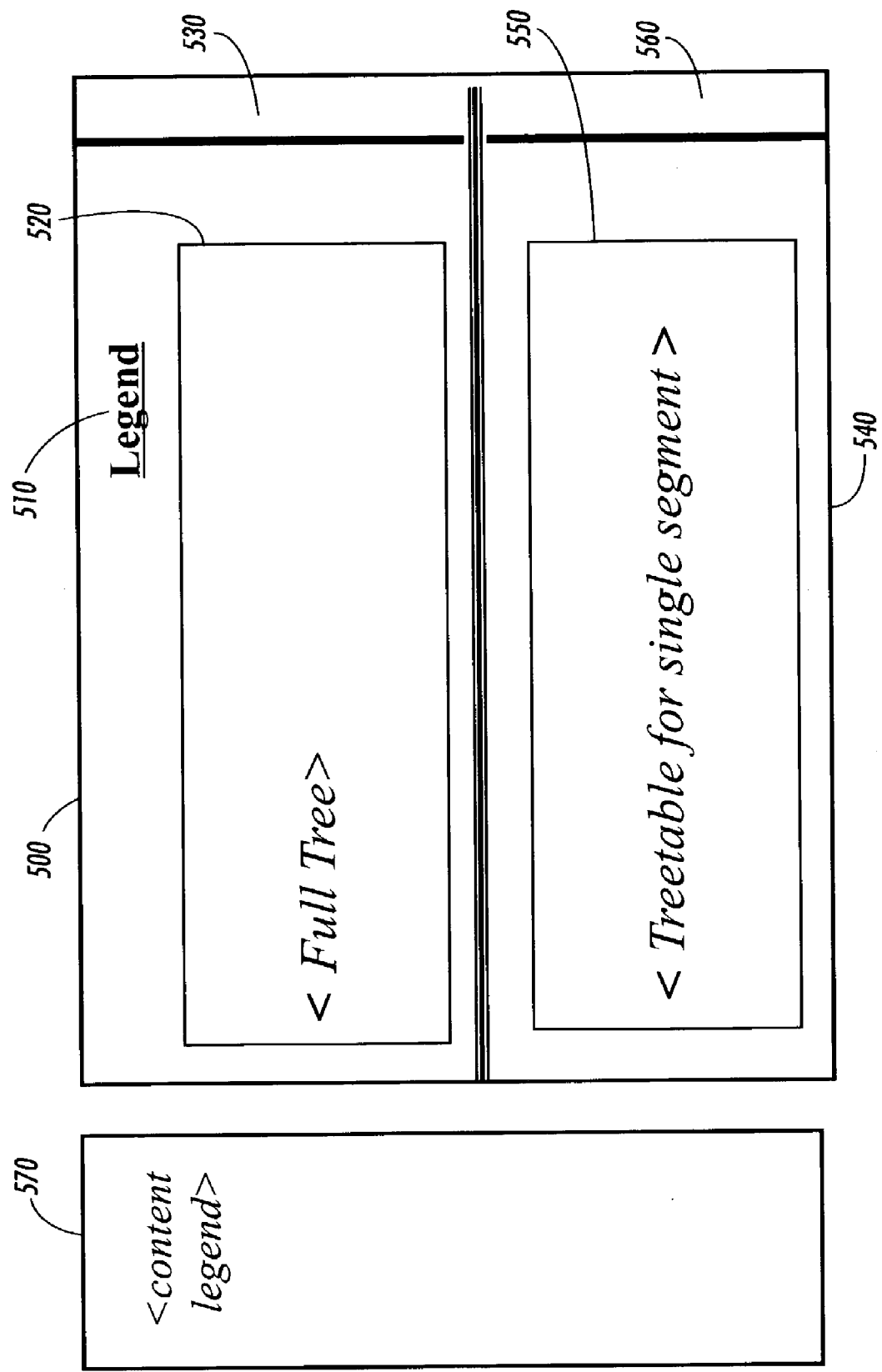
FIG. 5 illustrates the overall structure of a framed segmented treetable display.

Group overview 130 comprises a group header 110, and a collection of node overview strings 120, 121, 122, 123, 124, 125, and 126. Group header 110 identifies the group by:
  (a) a group number 111, in this example group 0,
  (b) a keyword list 112, listing frequent words seen in the texts associated with nodes in the group, that augments the extracted sentences with additional group content information. The list is obtained by adding and ranking by tf.idf weighted word counts for the texts, thus giving preference to words occurring less frequently in the discussion as a whole.
  (c) A group size indication 113, showing the total number of nodes in the group, in this example 31, from which nodes were selected for representation in the overview The group header 110 is linked to a display of a segmented treetable, an example of which is illustrated in FIG. 5, which shows the tree as a whole in the upper frame, and an expanded view of a group, or the first segment of a group, in the lower frame.

The node overview strings 120, 121, 122, 123, 124, 125 and 126 each represent a different node selected from the group for representation in the overview. It should be noted that overview strings for only a portion of the nodes that might be selected to represent the associated group are shown in FIG. 1. This is for illustrative purposes only and, in practice, more overview strings might be included and viewable, although some scrolling may be necessary. Each node overview string comprises one or more sentences selected from the node-associated text. If the entire text is not included in the node overview string, gap indicators 131, such as ellipsis symbols " . . . ", are used to indicate omitted sentences. In all overviews and summaries associated with this invention, strings representing individual nodes are organized to reflect the tree structure of the subtree or subtrees associated with the group. In this example, the structure is reflected by an adaptation of reduced-width trees, introduced in U.S. patent Ser. No. 09/732,028, now U.S. Pat. No. 6,683,632, titled "Method and System for presenting semi-linear hierarchy displays", by Paula Newman, incorporated by reference hereinabove. In the adaptation, a string representing a node that has no predecessors in the group is represented unindented, and prefixed by an initial indicator 127, chosen in this example to be a solid bullet. If a selected node n has selected descendants along only one path, the node overview string associated with the nearest such descendant is listed under the node overview string for node n, unindented, and prefixed by a no-sibling indicator 128, chosen in this example to be an outline bullet. All other strings are prefixed by a sibling indicator 129, in this example a solid bullet, and indented under the strings representing their closest selected parent in the group. Thus the nodes associated with node overview strings 121, 122, 123, and 125 all have the initial node as their closest parent represented in the group. The node associated with node overview string 124 is the single selected descendant of the node associated with node overview string 123, and node overview string 126 bears the same relationship to the node associated with node overview string 125.

FIG. 2 shows the second part of the overview for the same discussion as that shown in FIG. 1, and would be visible by scrolling or otherwise navigating from the view shown in FIG. 1. Groups 1 and 2, represented by group overviews 150 and 160, respectively, constitute humorous interludes in the discussion. The overviews for these groups are short, because the groups represented are relatively small, and do not contain children of the initial node. The group overviews 150 and 160 contain headers and text overview strings, such as group header 151, and node overview strings 152 and 153, organized in the same way as in FIG. 1.

FIG. 3 shows the third part of the same discussion as that shown in FIGS. 1 and 2, and again would be visible by scrolling or otherwise navigating from the views shown in FIGS. 1 and 2. Groups 3 and 4, represented by group overviews 170 and 180 respectively, are concerned with the ethics of purchasing something for less than its value as known to the buyer.

FIG. 4 illustrates a longer group summary, also obtained by methods described in this invention. Group summary 300 represents the same subtopic as that of group overview 170 of FIG. 3. It contains, by a parameter setting, approximately 10% of the total number of sentences in the texts of group 3. At the same time, by a series of parameter settings described in conjunction with FIGS. 23 through 27 hereinbelow, group summary string 300 represents fewer nodes than its counterpart group overview 170 of FIG. 3. Instead, it focuses on the texts that are most lexically central, and incorporates a considerable number of sentences from each, yielding a more readable digest that can often serve as a useful substitute for reading the texts in the group.

Group summary 300 comprises group header 310, a set of text summary strings 330, 340, 350, and 360, and a gap indicator 320. The text summary strings are slightly different in structure from the message overview strings of FIGS. 1 through 3, in that they include the text author, for example, text-author 331. However, this is an arbitrary difference; either type of text representation string could include or not include a text author or other text identifier. The text summary strings are also organized slightly differently from the text overview strings of FIGS. 1 through 3, in that a simple indented tree is used to portray the tree structure. In the indented tree, a summary string for a text is indented under the summary string for the nearest parent node that is represented in the summary. Gap indicators, such as gap indicator 320, indicate texts in the group not represented in the summary, and occurring in a tree path between the start of the group and some represented message, or between two represented texts. It should be noted that the two methods of organizing a set of text representation strings, namely via the reduced-width trees of FIGS. 1, 2, and 3, or the indented trees used in FIG. 4, can be used interchangeably for overviews and summaries alike. The reduced-width trees are useful for limiting the width of the digests when the text representation strings are deeply nested, and allow convenient "down the page" reading. The indented trees are a more familiar form that may be desirable in certain applications.

FIG. 5 through 8 illustrate the results of the methods of this invention concerned with visualizing large text trees, including text trees divided into logical groupings obtained by, but not limited to, the clustering techniques provided by this invention. FIG. 5 shows the structure of a segmented treetable presentation of a text tree. It is divided into two frames. Upper frame 500 contains a legend link 510, which, when selected, obtains a legend popup 570 containing a précis of the tree subdivisions, described in more detail with respect to FIG. 7 hereinbelow, and the remainder of the frame contains a full tree representation 520, described in more detail with respect to FIG. 6 hereinbelow. Lower frame 540 contains an expanded treetable 550 for a single segment, selected from among those presented in outline segmented treetable 520, and is described in more detail with respect to FIG. 8 hereinbelow. Because the content of both the upper and lower frames may be too long to be contained in a half-window, scrollbars 530 and 560 are provided so that the frames may be independently scrolled.

Figure 6:
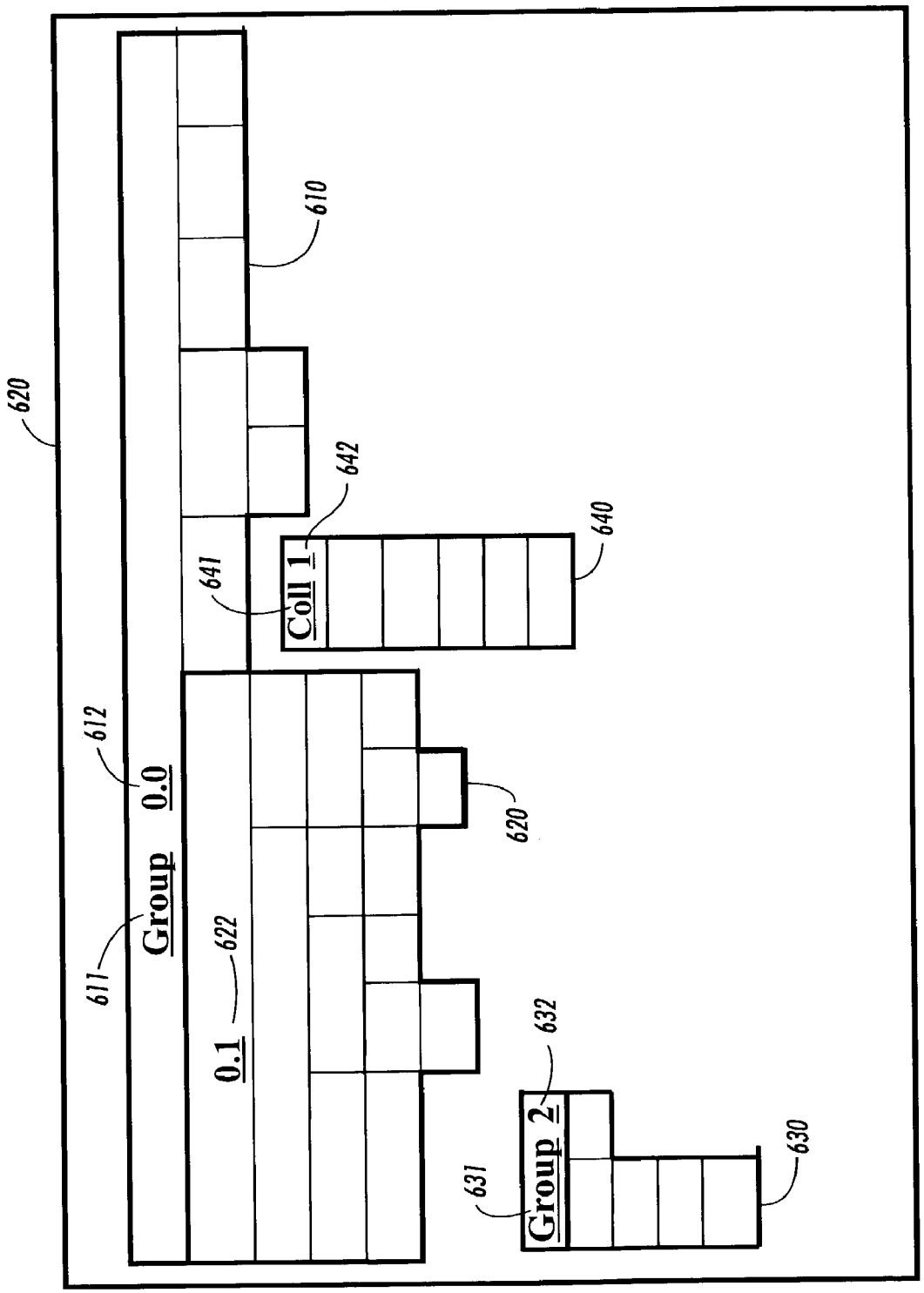
FIG. 6 illustrates a segmented outline treetable

FIG. 6 illustrates a segmented outline treetable 600 which can be used to represent full tree 520 in upper frame 530 of FIG. 5. The outline treetable 600 is divided into segments 610, 620, 630, and 640, each segment containing one or more subtrees, and each segment sized so that, when expanded across a window, a significant amount of text can be contained in each cell. Segments 610 and 620 are connected into a single region because, in this example, they form a contiguous part of a previously identified logical unit, such as a cluster obtained by the methods of this invention. The segments of a region may be visually differentiated from each other by outlining, and/or by cell background. For example, different colors, different shades of the same color, and/or different stipple backgrounds may be used. Segments 630 and 640 make up separate regions, and are visually separated from the region containing segments 610 and 520, yet their cells retain their relative physical placement in the overall structure of the text tree. Regions may also be visually differentiated from other regions by outlining and/or cell backgrounds, as discussed above. Each segment contains a segment link, such as segment links 612, 622, 632, and 642, which, when selected, obtains a treetable for that segment alone, which may appear in the lower frame of FIG. 5. The segment links labels here denote their associated logical units, or subparts thereof, so segment links 612 and 622 are, respectively, the $0^{th}$ and $1^{st}$ segments of unit 0, while segment link 632 identifies the segment as the only one of unit 2. Each region may also contain a region link, such as region links 611, 631, and 641, that, when selected, may obtain information about the associated logical unit, such as a cluster overview, and in this example also serves to identify the type of unit. In this illustration, region links 611 and 621 identify their associated logical units as "groups" of texts considered to represent subtopics, while region link 641 identifies its associated logical unit as a less focused "collection" of texts.

Figure 7:
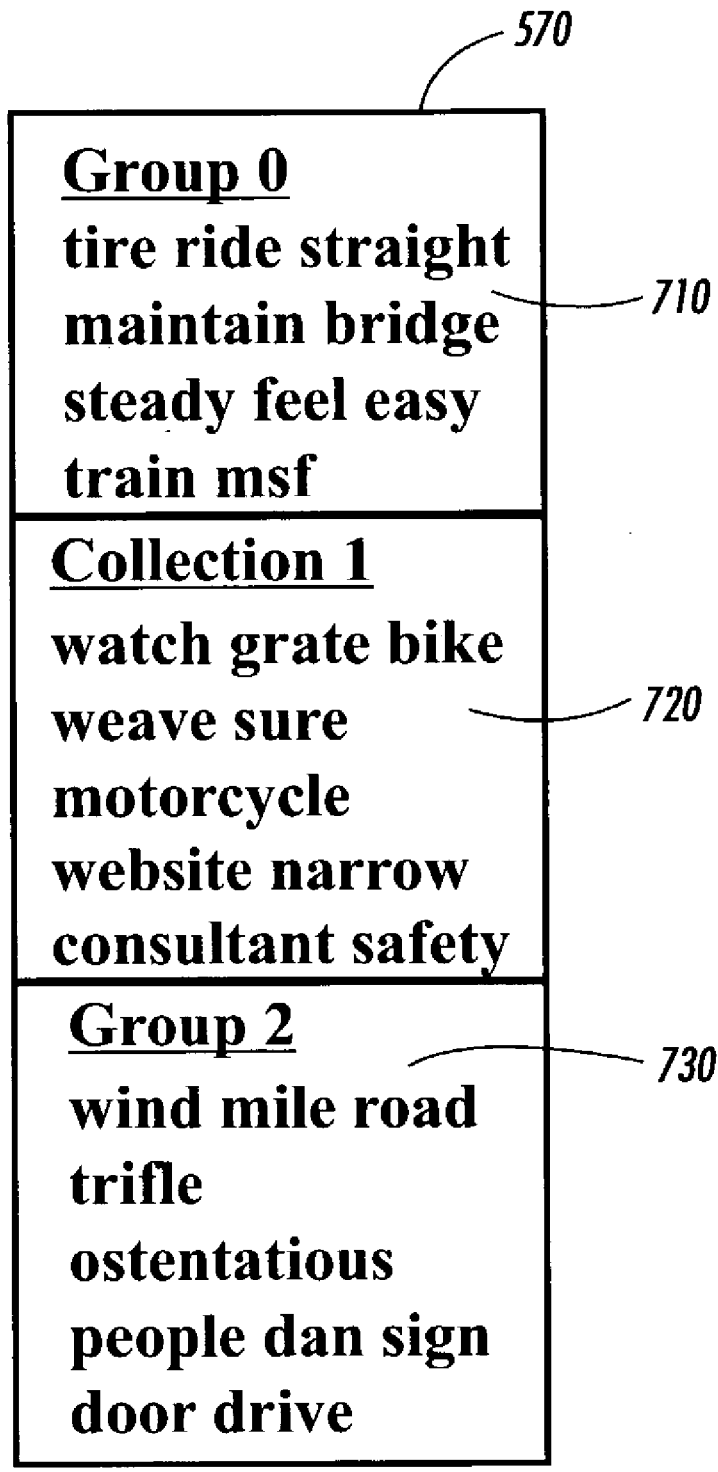
FIG. 7 illustrates a legend popup for the framed segmented treetable display

FIG. 7 illustrates a content legend popup 570, which is shown when legend link 510 in FIG. 5 is selected. It indicates the content of tree subdivisions by brief subdivision characterizations 710, 720, and 730, to assist a reader in selecting a subdivision for expanded viewing. In this case the subdivisions reflected are the regions of the segmented treetable of FIG. 6, which are coextensive with the subtopics and other collections found in the text tree, and the characterizations are the lists of frequent words for the associated text groupings discussed hereinabove. For example, subdivision characterization 710 contains information about the region made up of segments 610 and 620 ("Group 0") of FIG. 6, with the information in this case comprising a list of frequent words. Subdivision characterizations 720 and 730 likewise correspond to the regions containing segments 640 and 630 from FIG. 6, respectively.

FIG. 8 illustrates an expanded view of a single segment, in this case segment 630 of FIG. 6, that might be displayed in the lower frame 540 of FIG. 5. It contains a set of controls 800, and a treetable 860 composed of cells 810, 820, 830, 840, and 850. The full text associated with a cell can be read by selecting the author link within that cell, such as author link 822. The controls 800 contain a segment identifier 801, and other controls which are essentially the same as those described for treetables in U.S. patent application Ser. No. 09/954,388, still pending, titled "Method and Apparatus for the Construction and use of Table-like visualizations of Hierarchic Material, by Paula Newman and Stuart Card, included by reference hereinabove. The controls, used in coordination with cell identifier links, such as cell identifier link 821, permit in-situ expansion of all cells within individual columns or subtrees, so that more text can be displayed for those cells, as well as the extraction ("read") of the full, concatenated texts associated with all cells in a column, or with a cell and its immediate successors. A segment treetable placed in a lower frame of 540 of FIG. 5 can be visually related to a segment of a segmented treetable 520 of FIGS. 5 and 6 in the upper frame 500 of FIG. 5 by using a frame background identical to the segment cell backgrounds given to the cells of the corresponding segment in treetable 520.

Figure 9:
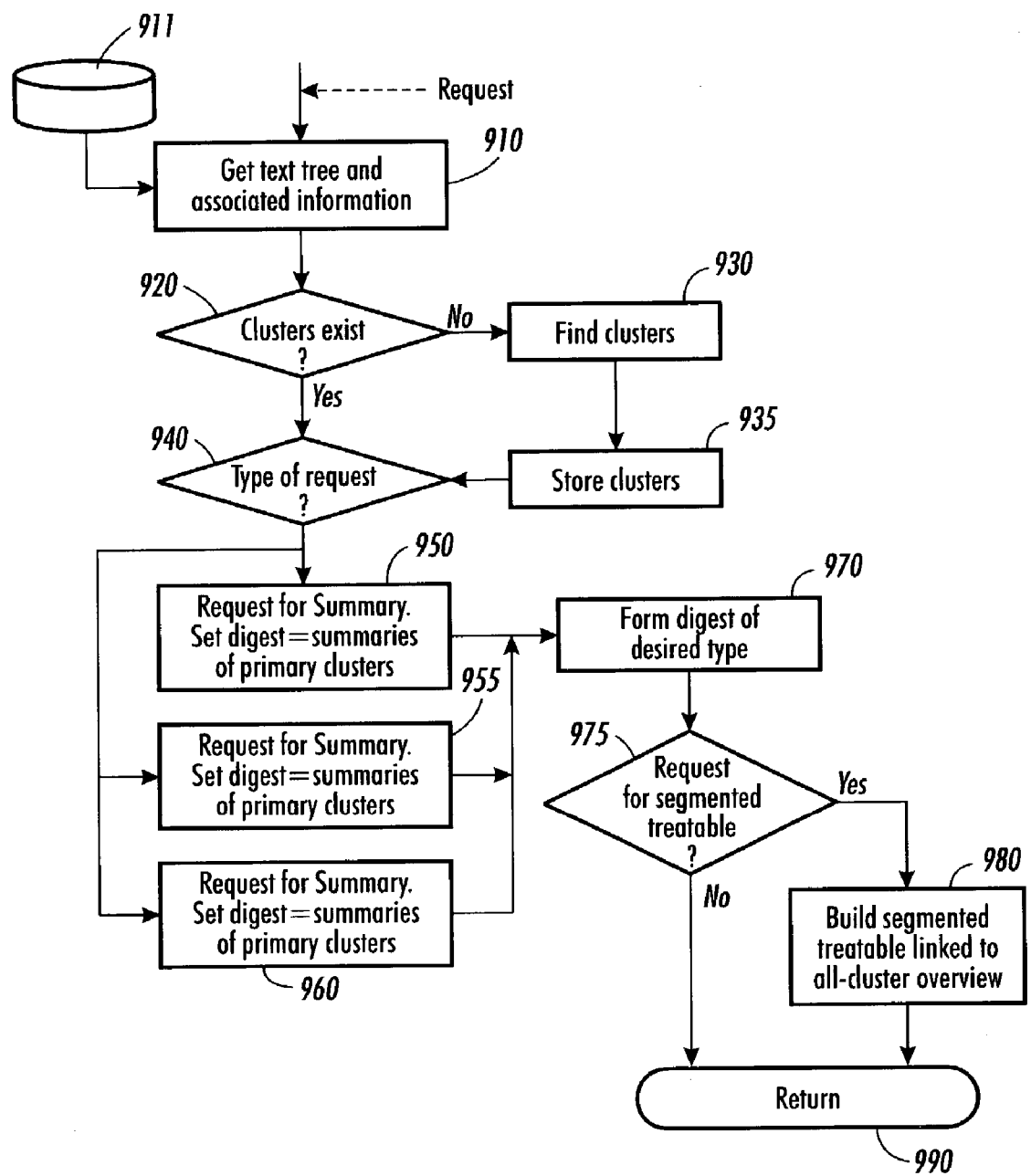
FIG. 9 is a flow diagram of the major processes associated with this invention.

Now moving to the methods for developing the subtopic groupings, overviews, summaries, and segmented treetable visualizations, FIG. 9 describes the interactions among the major processes in one embodiment of this invention. The control routine, having received a request for an overview, summary, or segmented treetable presentation of tree-structured texts, enters at box 910, where it accesses the text tree and associated information from data storage 911. Data storage 911 can be part of the main memory of the processing node, or a local or shared storage device accessible from the processing node, or a storage device accessed by request to another processing node across a network. The control routine then moves to decision box 920 where it checks whether the associated information includes clustering information. If so, the control routine moves to decision box 940. Otherwise, the control routine moves to box 930, described in more detail with respect to FIG. 10, to obtain the primary clusters and secondary collections for the tree. The control routine then moves to box 935 where it stores the clustering result information, and then moves to decision box 940.

At decision box 940 the control routine checks the type of input request. If the request is for a tree summary, it moves to box 950, where it sets digesting parameters for a summary of the primary clusters, and then moves to box 970. If the request is for a tree overview, the control routine moves to box 955 where it sets digesting parameters for an overview of primary clusters, and then moves to box 970. If the request is for a segmented treetable linking to digests of all regions, the control routine moves to box 960 where it sets digesting parameters for an overview of all clusters, both primary clusters and the secondary collections also represented in the treetable, and then the control routine moves to box 970.

Figure 14:
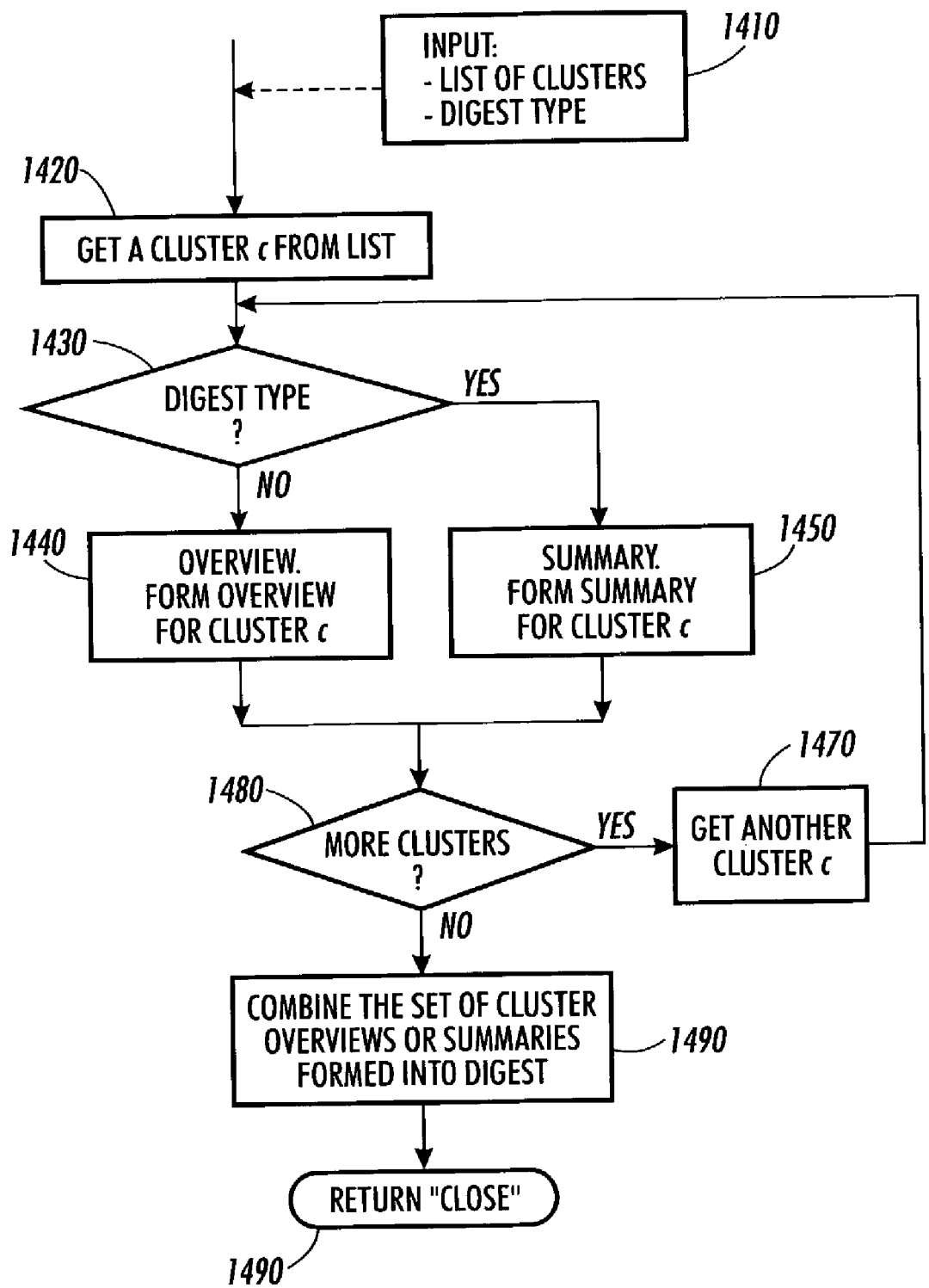
FIG. 14 is a flow diagram of the overall process of constructing a digest

At box 970, described in detail in conjunction with FIG. 14, the control routine forms a digest of the desired type. It then moves to box 975 to check if the request was for a segmented treatable. If not, the control routine returns at box 990. Otherwise the control routine moves to box 980, described in more detail with respect to FIG. 27, where it forms the treetable and links it to the full overview, and then returns at box 990.

Figure 10:
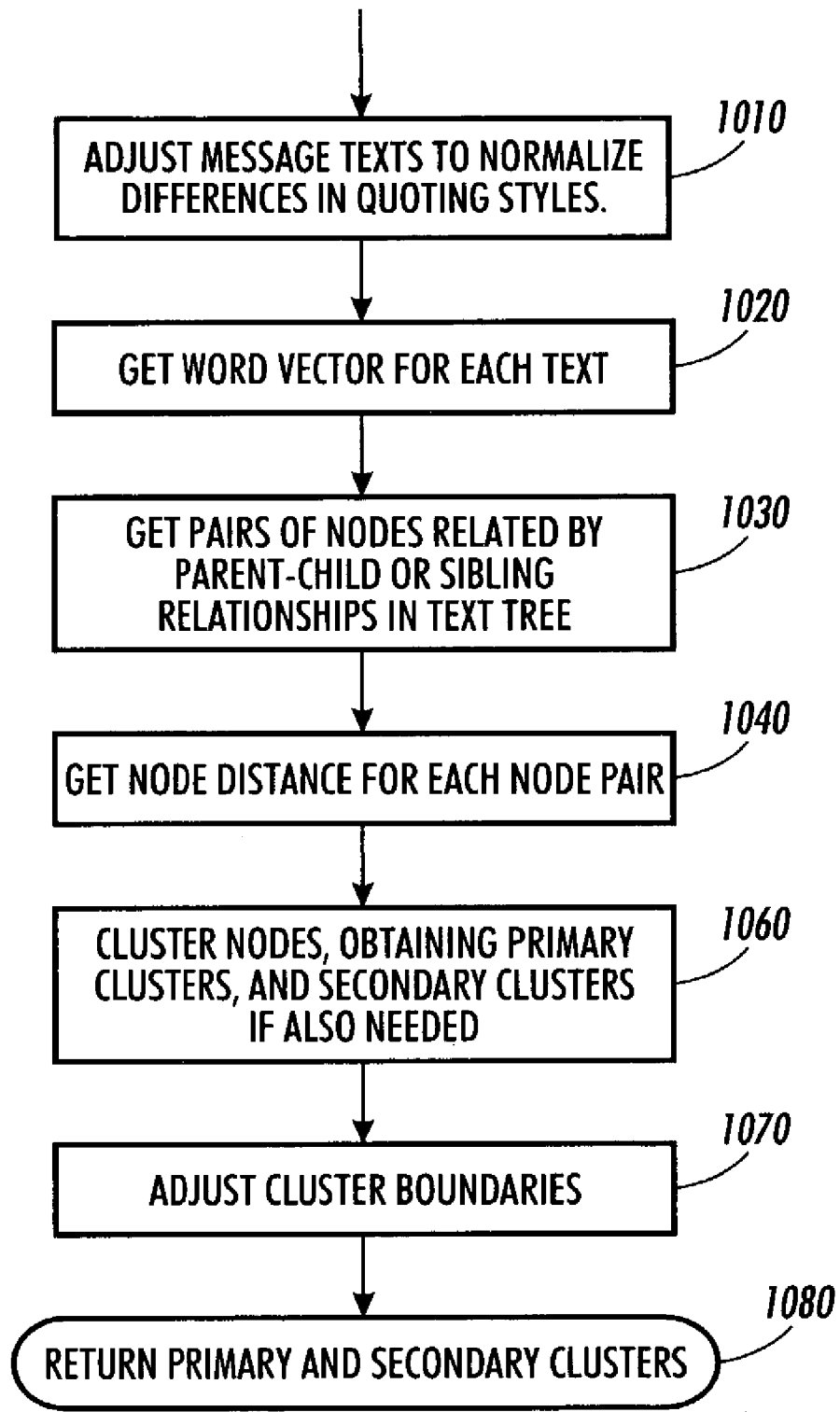
FIG. 10 is a flow diagram of the clustering process.

FIGS. 10 through 13 describe the clustering method of box 930 in FIG. 9 according to one embodiment of this invention. FIG. 10 covers the general process of grouping the nodes of the text tree into clusters. The control routine enters at box 1010, discussed in more detail hereinbelow with respect to FIG. 11, where if the texts are email-style messages, they are adjusted to normalize differences among quoting styles. The control routine then moves to box 1020 where word vectors are obtained for each node-associated text. In one embodiment of this invention, the word vectors can be obtained by one of two alternative methods. The first method is to use only stemming, removing stop words, and expressing the results as idf-weighted frequencies, with the frequencies somewhat attenuated to limit the effect of repeating a word many times within a single text. The second method of obtaining word vectors is by using the PLSA processing described by T. Hoffman (in the context of obtaining word-probability vectors to an arbitrary collection of texts) in the paper "Probabilistic Latent Semantic Indexing", referenced hereinabove. In this second method, the word vectors are obtained by:

a) First, using the initial word vectors associated with a collection as input, a second vector is obtained for each text representing it as a mixture of latent semantic classes, that is, a probability distribution over the set of such classes. This second vector is called a class probability vector.

b) Then, these class probability vectors are converted into word-probability vectors. A word-probability vector for a text may have non-zero probabilities in positions for words that are associated with words in the text, but do not actually appear there.

After computing word vectors for each text, the control routine moves to box 1030 where it finds the node pairs related in either a parent-child or sibling relationship in the tree. It then moves to box 1040 where it computes the lexical distance between the texts of each such node pair. If the word vectors for the texts contain raw or weighted counts, the distance measure used is the standard cosine distance. If the word vectors for the texts contain probabilities obtained by PLSA processing, the distance measure used in one embodiment is the Hellinger similarity, namely the sum of the square roots of the products of the positionally matching vector elements $$\sum_{j=1}^{n} \sqrt{v_{1_j} \cdot v_{2_j}},$$

converted to a relative distance. In other embodiments other similarity measures can be used, such as the Clarity similarity measure, described in the paper, "Topic-Based Document Segmentation with probabilistic latent Semantic Analysis", by T. Brants, F. Chen, and I. Tsochantaridis, in the Proceedings of the 2002. Conference on Information and Knowledge Management, pp. 211–208, The control routine them moves to box 1060, discussed in more detail hereinbelow with respect to FIG. 12, where it obtains primary clusters representing groupings of more closely related nodes that may be used in a digest, and, if needed, secondary clusters of less closely related nodes that may be used for groupings within other tree visualizations. The control routine then moves to box 1070 where it may make some minor adjustments at cluster boundaries based on structural considerations involving nodes with many children. In particular:

(a) In the clustering process the root node may initially be held out from clustering, and at this point connected to the cluster containing its closest related child. This is done to avoid placing in a single cluster nodes relating to different issues raised in the root node text.

(b) A related approach may be used for any node with many children. After the clustering process, if all children of a node with many children have been placed in the same subcluster, the inter-node similarities of the children may be examined to determine if the children fall into two or more distinct groups. If so, the association between the parent and the group containing the nearest child might be retained, and the other groups used to head disjoint clusters.

(c) A parent node in a cluster c may be moved to a cluster c' if all children of the parent belong to cluster c'

Figure 11:
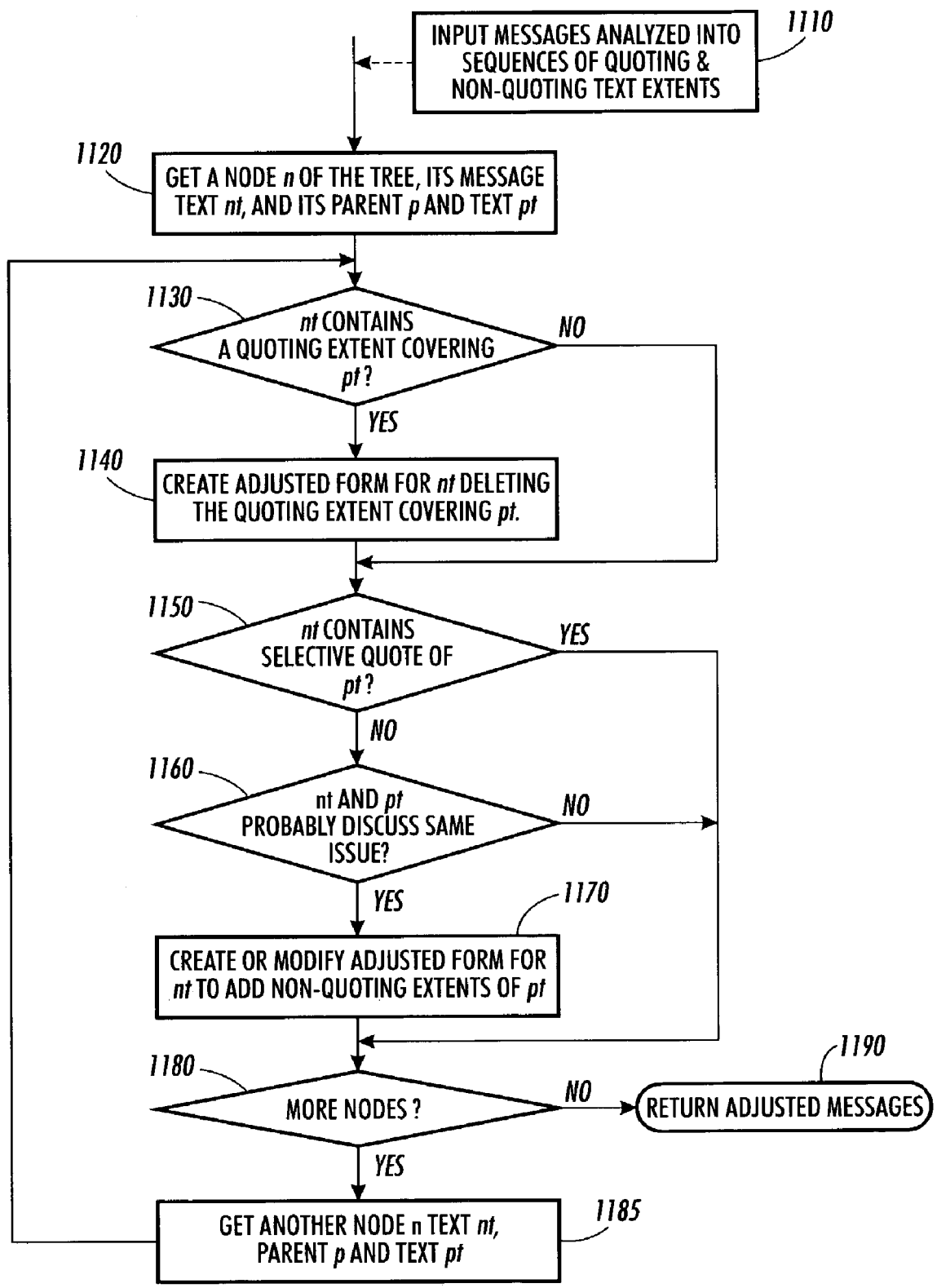
FIG. 11 is a flow diagram of the method for normalizing quotes within messages.

FIG. 11, which details the process of box 1010 of FIG. 10, describes the method of normalizing quotes within messages, incorporating quotes of parent messages likely to form logical parts of their children which, in this embodiment, is determined by a combination of the existence of selective quotes, and relative parent and child message sizes. Box 1110 represents the input to the process, comprising the node-associated texts of the tree, which in this case are messages, partitioned into quoting and non-quoting extents. In the analysis in this embodiment, nested quoting extents are ignored. The control routine enters at box 1120 where it gets a node n of the tree, its associated node text nt, its parent node p, and the associated parent text pt and moves to box 1130. At decision box 1130, the control routine checks whether node text nt contains a non-selective quote of parent text pt that is, whether there is a quoting extent in node text nt that completely covers parent text pt. If so, the control routine moves to box 1140 where it creates an adjusted form for node text nt deleting the extent covering parent text pt, and moves to box 1150. At decision box 1150 the control routine checks whether node text nt contains any selective quotes of parent text pt, that is, one or more quoting extents none of which separately cover all of parent text pt. If so, the control routine moves to box 1180. If not, the control routine moves to box 1160. At box 1160 the control routine checks whether both node text nt and parent text pt probably deal with the same issue. In the present embodiment it is assumed that node text nt and parent text pt probably deal with the same issue if both texts are no more than approximately 400 characters in length, taking into account only stemmed non-stop words. If so, it moves to box 1170 where it adds all or part of parent text pt to a new or previously created adjusted form for node text nt. If not, the control routine moves to box 1180. At box 1180 the control routine checks whether there are any unprocessed nodes in the tree, and if so it moves to box 1190 where it gets another node n, its associated node text nt, and its parent p and associated parent text pt, and then moves to box 1130. If there are no more unprocessed messages the control routine moves to box 1190 where it returns the quote-adjusted messages.

Figure 12:
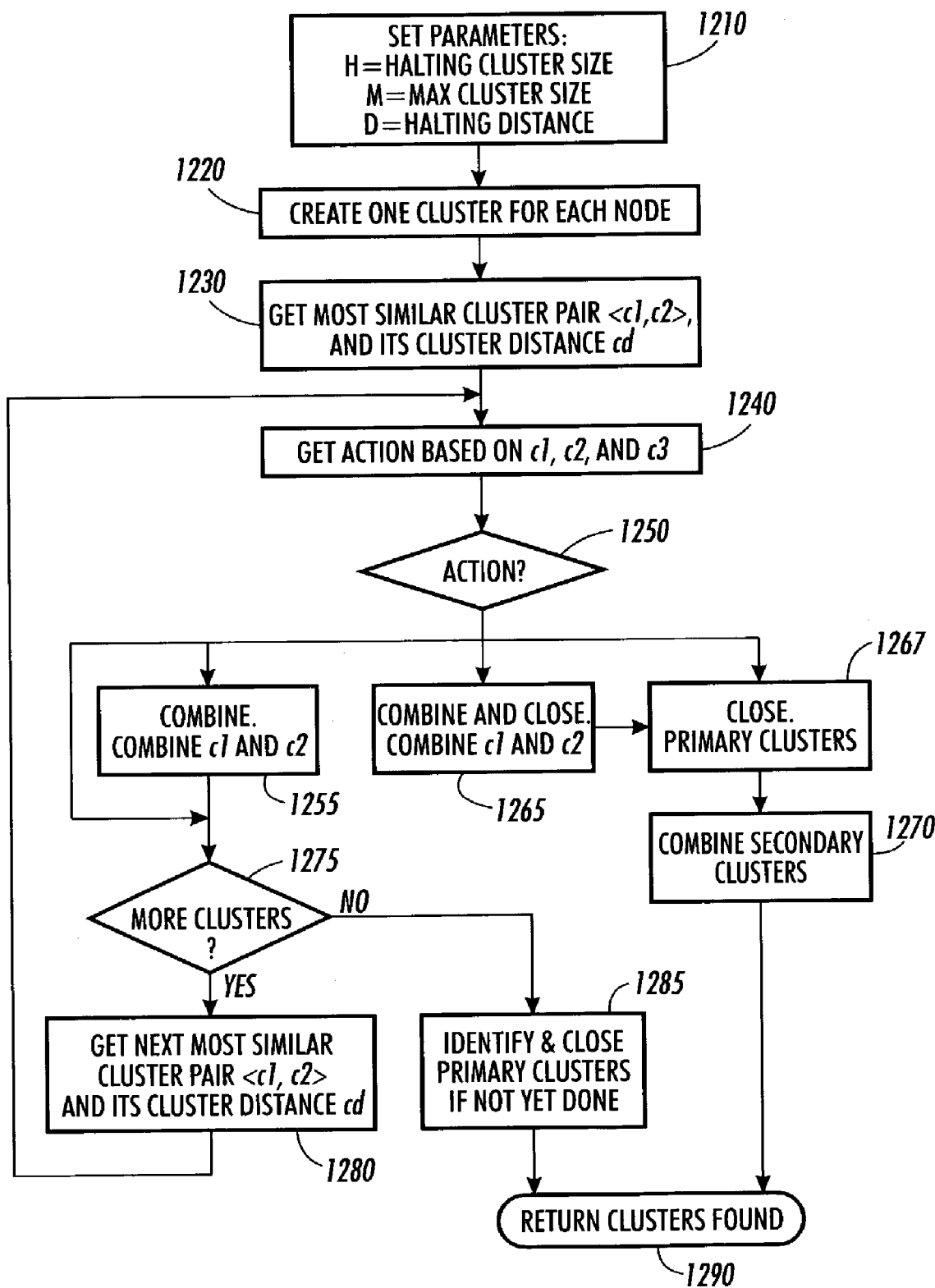
FIG. 12 is a flow diagram of the method for clustering nodes

FIG. 12, which details the process of box 1060 of FIG. 10, describes the node clustering procedure. The control routine enters at box 1210 and sets the parameters H, M, and D that govern the clustering process. Halting cluster size H is the cluster size that, when reached, halts the primary clustering process. Maximal distance D is a distance which, when reached also halts the clustering process. In the current embodiment, maximal distance D is a distance that is 75% of the largest node distance associated with a node pair. Maximum cluster size M is larger than the halting cluster size H, and is the maximum size cluster that can be formed. The control routine then moves to box 1220 where it creates one cluster for each node in the tree, and moves to box 1230. At box 1230 the control routine begins by selecting the most similar cluster pair <c1, c2>, to combine and its cluster distance cd. In one embodiment the most similar cluster pair <c1, c2> is the cluster pair linked by the node pair <n1, n2> with the smallest associated node distance, where the node distance is the lexical distance between the two nodes, and the cluster distance cd is that node distance. However, other factors may be taken into account in selecting the most similar cluster pair, for instance, in other embodiments, a) computing the cluster distance between each pair of clusters linked by at least one node pair as a function of the node distances of all node pairs linking the two clusters, and the distance between the lexical centroids of the two clusters, and selecting the pair of clusters with the smallest so-computed cluster distance, b) Computing the cluster distance between each pair of clusters linked by at least one node pair as a function of the smallest node distance of the node pairs linking the two clusters and the distance between the lexical centroids of the two clusters, and selecting the pair of clusters with the smallest so-computed cluster distance, and c) Computing the cluster distance between each pair of clusters linked by at least one node pair as a function of the largest node distance of the node pairs linking the two clusters and the distance between the lexical centroids of the two clusters, and selecting the pair of clusters with the smallest so-computed cluster distance.

After finding the most similar cluster pair, the control routine moves to box 1240. At box 1240, discussed in more detail with respect to FIG. 13, the control routine determines the action to be taken for clusters c1 and c2, and moves to decision box 1250. At box 1250 the control routine checks what action has been determined. It no action is to be taken, the control routine moves directly to decision box 1275. If the required action is "combine", the control routine moves to box 1255 where it combines clusters c1 and c2 and moves to decision box 1275. If the required action is "combine and close", the control routine moves to box 1265 where it combines clusters c1 and c2 and moves to box 1267. If the required action is to just "close" the primary clusters, the control routine moves directly to box 1267. At box 1267 the control routine examines the current set of clusters and identifies as "primary", for use in constructing digests, all current clusters larger than a given minimum size, and identifies the remaining clusters as secondary. In this embodiment the minimum size for primary clusters is 5 texts, but it could equally well be set as a function of the number of texts in the tree. After closing primary clusters at box 1267, the control routine moves to box 1270. At box 1270 the control routine may combine all adjacent secondary clusters, and, when all adjacent secondary clusters are combined, may also combine very small secondary clusters with adjacent primary clusters. This is done, for example, to permit the visualization of the tree within a treetable as divided between groups representing primary clusters, and other collections of less closely related nodes. After possibly combining secondary clusters at box 1270 the control routine moves to box 1290.

At decision box 1275 the control routine determines whether there are clusters that have not yet been closed. If so, it moves to box 1280 where it gets the next most similar cluster pair <c1, c2> and moves to box 1240 to continue iterating. If not, the control routine moves to box 1285. At box 1285 the control routine checks whether primary clusters have been identified as yet and, if not, marks as "primary" all current clusters larger than a given minimum size, and moves to box 1290.

At box 1290 the control routine returns the primary and secondary clusters found,.

Figure 13:
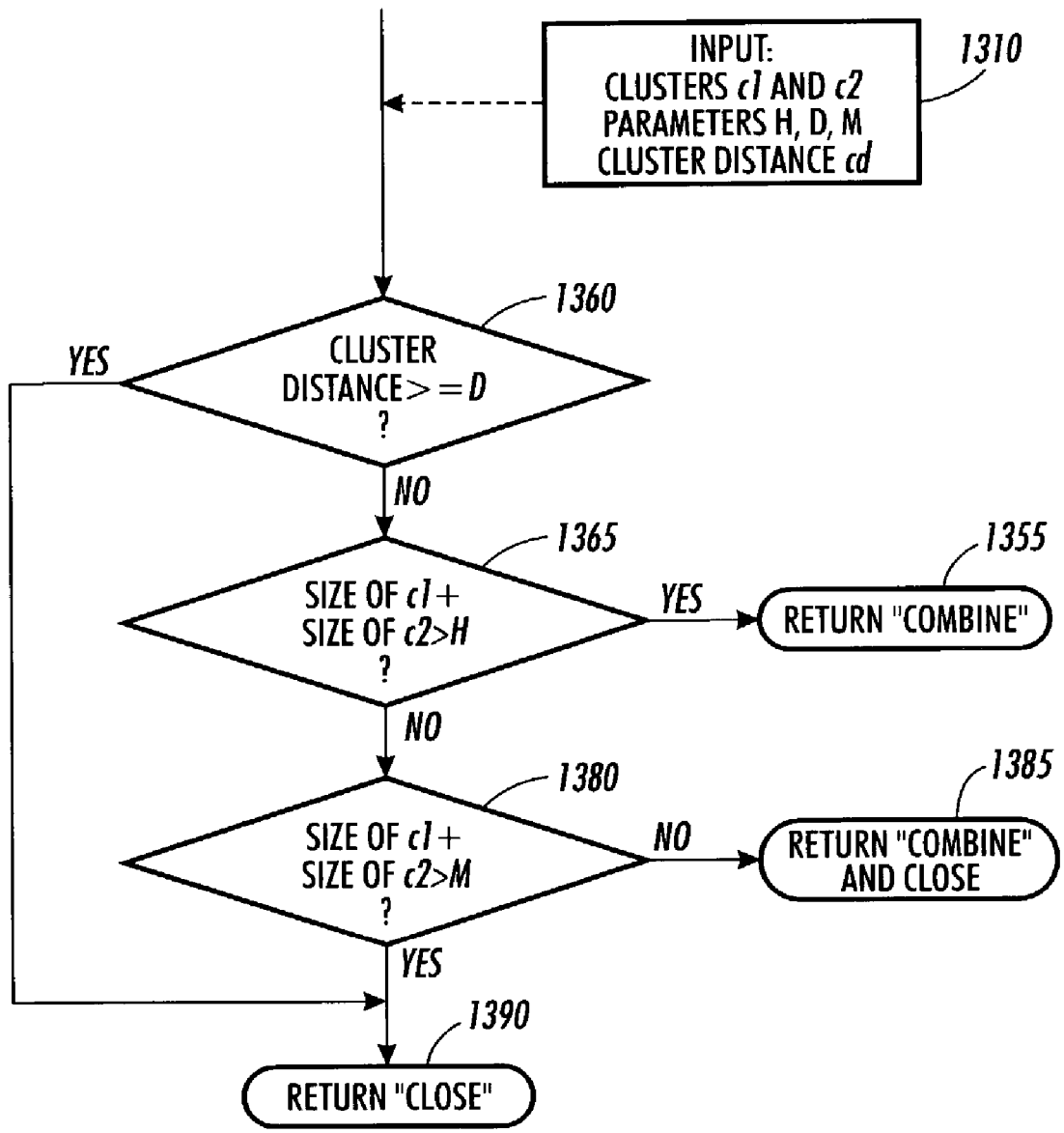
FIG. 13 is a flow diagram of the method for analyzing cluster pairs

FIG. 13, describes the process of determining an action to be taken for a particular cluster pair during the clustering process, from box 1240 of FIG. 12. Box 1310 describes the input, comprising two clusters, c1 and c2, the distance between them, whether primary clusters are being formed, and a set of parameters comprising a halting cluster size H, a maximum cluster size M, and a maximum distance D, discussed with respect to box 1210 of FIG. 12 hereinabove. The control routine enters at decision box 1360, where it checks whether the cluster distance between clusters c1 and c2, measured as described with respect to box 1230 in FIG. 12, equals or exceeds the maximum distance D and, if so moves to box 1390. Otherwise the control routine moves to decision box 1365 where it checks whether the combined size of c1 and c2 is less than the halting cluster size H. If so, it moves to box 1355 where it returns the required action "combine". Otherwise the control routine moves to decision box 1380 where it checks whether combined size of clusters c1 and c2 is greater than the maximum cluster size M and, if so, moves to box 1390 where it returns the required action "close". However, if at decision box 1380 the control routine determines that the distance between c1 and c2 is not greater than maximum cluster size M, it moves to box 1385 where it returns the required action "combine and close".

FIG. 14, detailing the process of box 970 of FIG. 9, describes the general method of forming a digest by forming and combining overviews or summaries of individual clusters. Box 1410 describes the input to the process, comprising a list of clusters to be digested, and the kind of digest desired, which is either an overview or summary. The control routine enters at box 1420 where it gets a cluster c from the list. It then moves to decision box 1430 where determines the type of digest requested. If an overview was requested, the control routine moves to box 1440, described in more detail with respect to FIG. 15, where it obtains a formatted string representing the overview for cluster c, and then moves to decision box 1460. If, however, a summary was requested, the control routine moves to box 1450, described in more detail with respect to FIG. 22, where it obtains a formatted string representing a generally longer summary for cluster c, and then moves to decision box 1460. At decision box 1460 the control routine checks whether there are any more unprocessed clusters in the input list. If so, it moves to box 1470 where it gets another cluster c from the list, and then moves to box 1430. If, however, the text at box 1460 indicates that all clusters have been processed, the control routine moves to box 1480 where it combines the overview or summary strings obtained for each cluster into a digest, and then returns the digest at box 1490.

Figure 15:
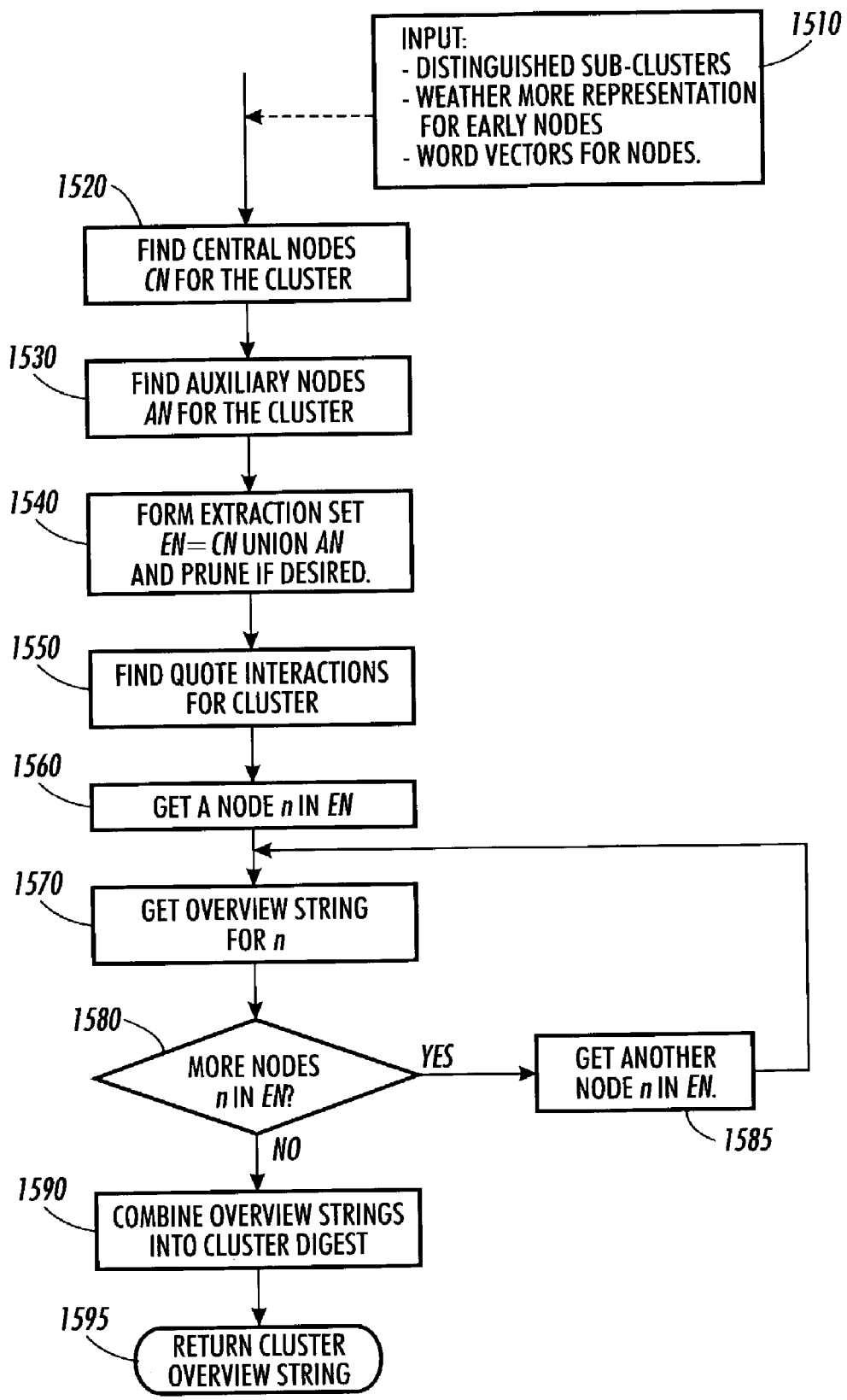
FIG. 15 is a flow diagram of the method for forming a cluster overview.

FIGS. 15 through 18 describe the method of forming a cluster overview in box 1440 of FIG. 14 according to one embodiment of this invention. FIG. 15 describes overall formation process. Input to the process is indicated in box 1510 as comprising (a) a set of distinguished subclusters, possibly empty, selected to ensure coverage for the cluster as a whole, (b) an indicator of whether more representation is to be given to early nodes in the tree, and (c) word vectors for the nodes of the cluster Giving more representation to early nodes in the tree is relevant for trees representing conversations in discussion lists, to provide more information in the overview about responses to questions or issues raised in the root message. The control routine enters at box 1520, described in more detail with respect to FIG. 16, where it finds a set of central nodes CN whose texts are lexically central to the cluster as a whole or to significant subclusters. The control routine then moves to box 1530, where it finds a set of auxiliary nodes AN for the cluster. These nodes include nodes in the cluster that are either parents of central nodes, or parents of more than a given number of nodes, but are not themselves central nodes. For trees representing stored messages, sentences quoted (or implicitly quoted) in one or more central responses to an auxiliary node message represent material most germane to the discussion; the inclusion of those sentences and their responses provide both coverage and continuity to the overview. The inclusion of parents of many possibly non-central nodes serves to give representation to structurally important nodes. After identifying auxiliary nodes in box 1530, the control routine moves to box 1540 where it combines the set of central nodes CN and the set of auxiliary nodes AN to form the extraction set EN, that is, the set of nodes from whose texts sentences will be extracted, and reduces the size of extraction set, if desired, to a proportion of the cluster size. In the current embodiment, nodes are pruned from both the set of central nodes CN and the set of auxiliary nodes AN, although pruning may be done in only CN or AN or omitted altogether The control routine then moves to box 1550, described in more detail with respect to FIG. 17, where it finds the quoting interactions to be used in extracting sentences for the cluster overview. Specifically, it finds a quoted set QD of quoted nodes and associated quoted sentences, and a quoting set QG of quoting nodes and quoting sentences, such that the quoting sentences in quoting set QG match quoted sentences in quoted set QD. The eventual overview construction method will use this information to create extracted sequences of quoted sentences and responses to those sentences in the summary. After finding quoting interactions in box 1550, the control routine moves to box 1560 where it gets a node n in extraction set EN and moves to box 1570. At box 1570, described in more detail with respect to FIG. 18, the control routine obtains the string to be used to represent node n in the overview, and moves to decision box 1580 where it checks whether there are more nodes in extraction set EN to be processed. If so, the control routine moves to box 1585, where it gets another node n in extraction set EN and moves to box 1570. Otherwise the control routine moves to box 1590, described in more detail with respect to FIG. 20, where it combines and formats the node representation strings obtained for the nodes in extraction set EN into a single overview digest for the cluster, and then to box 1595 where it returns that digest.

Figure 16:
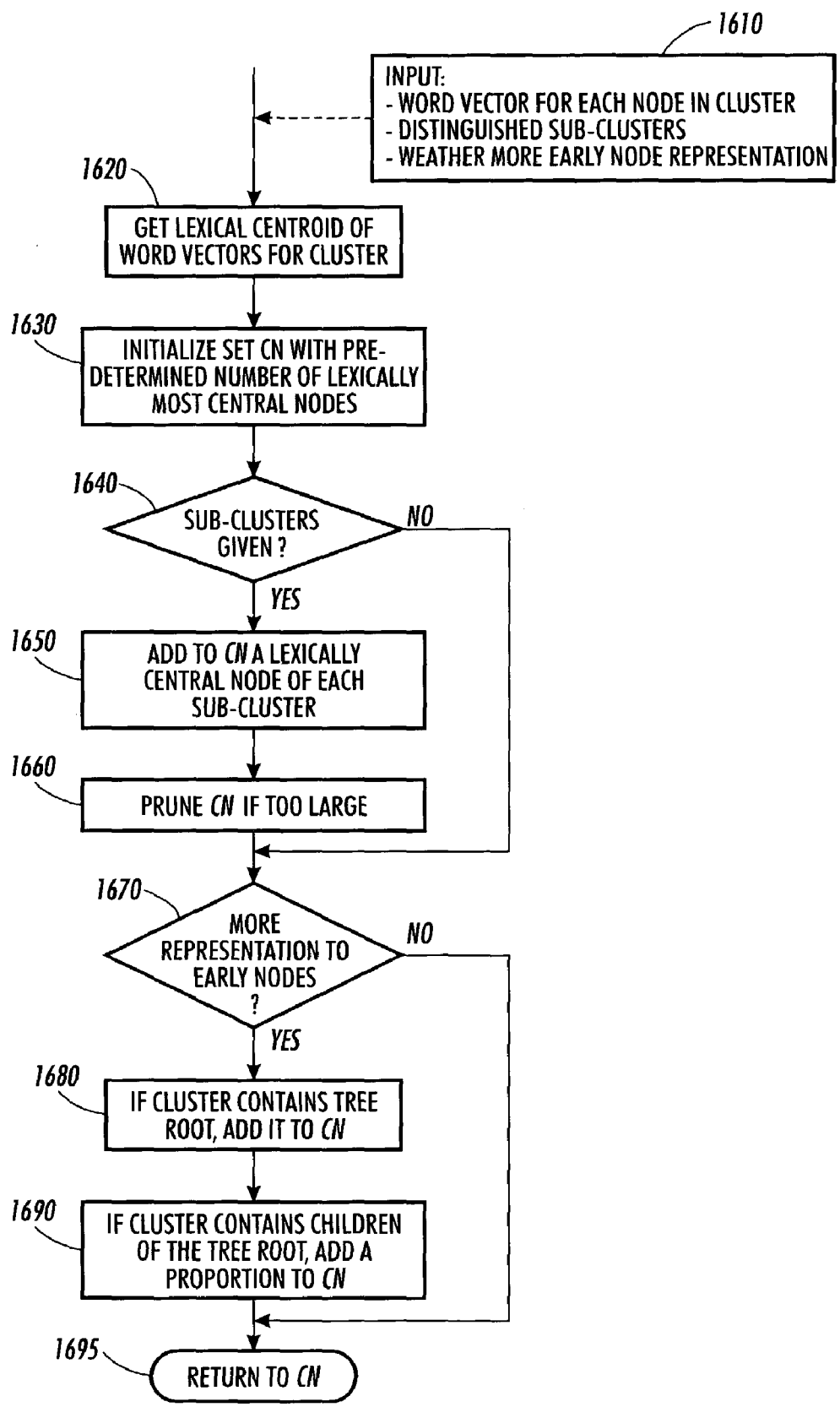
FIG. 16 is a flow diagram of the method for finding the central nodes of a cluster.

FIG. 16, details the process of box 1520 of FIG. 15, which finds the set of central nodes for a cluster, that is, the nodes central to obtaining coverage for the cluster in the overview. Box 1610 describes the assumed input to the process, comprising (a) the word vectors associated with each node in the cluster, (b) distinguished subclusters if any, and (c) whether more coverage is to be given to early nodes in the tree. The control routine enters at box 1620 where it finds the lexical centroid L of the word vectors for the cluster, which is the vector sum of the word vectors for the cluster divided by the number of vectors, and then moves to box 1630. At box 1630 the control routine initializes the set of central nodes CN with nodes whose word vectors are closest to lexical centroid L. The number of nodes used to initialize CN is proportional to the size of the cluster. The control routine then moves to decision box 1640. At 1640 the control routine checks whether a set of distinguished subclusters have been given and, if not, moves to decision box 1670. Otherwise it moves to box 1650 where it adds one node to the set of central nodes CN for each such subcluster, the added node being the node whose word vector is closest to the lexical centroid of the subcluster, and moves to box 1660. At box 1660 the control routine removes some nodes from the set of central nodes CN if it has grown too large in proportion to the total number of nodes in the cluster, and moves to decision box 1670.

At decision box 1670 the control routine checks whether more representation is to be given to early nodes in the cluster and, if not, moves to box 1695. Otherwise it moves to box 1680 where, if the tree root is part of the cluster it is added to the set of central nodes CN and the control routine moves to box 1690. At box 1690 the control routine determines whether any children of the overall tree root are also part of the cluster and, if so, adds a proportion of them to the set of central nodes CN, and moves to box 1695. At box 1695 the control routine returns the set of central nodes CN.

Figure 17:
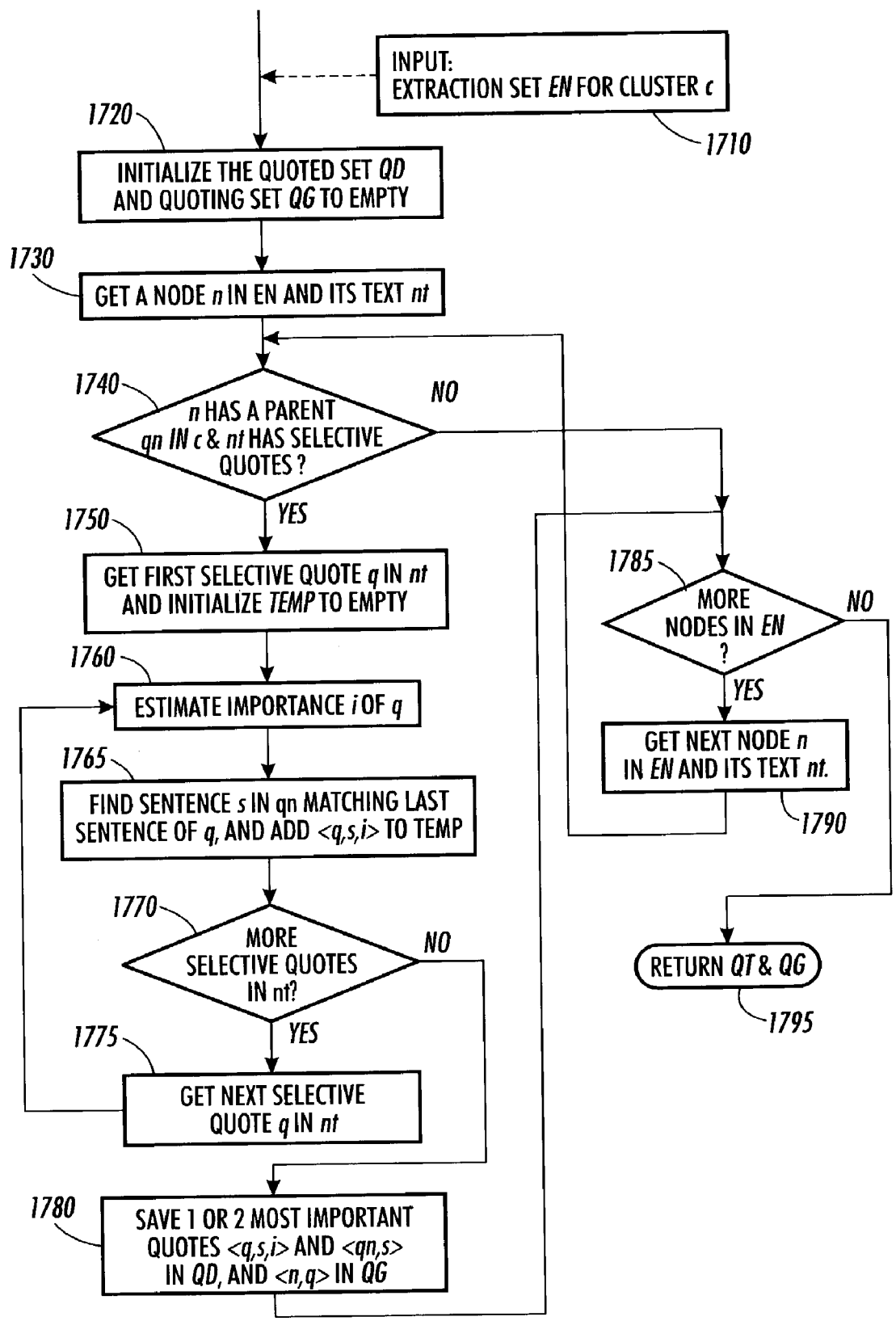
FIG. 17 is a flow diagram of the method for analyzing quote interactions within a cluster

FIG. 17, detailing the process of box 1550 of FIG. 15, describes the method of finding important quote interactions for a cluster, which in this embodiment are modeled as a quoted set QD of quoted nodes and quoted sentences, and a quoting set QG of quoting nodes and quoting passages. Box 1710 represents the input to the process, comprising the extraction set EN of nodes in the cluster from which sentences are to be extracted to form the summary. The control routine enters at box 1720 where it initializes the quoted set QD and the quoting set QG to be empty, and moves to box 1730 where it gets a node n from extraction set EN, and its associated node text nt. The control routine then moves to decision box 1740 where it checks whether node n has a parent node qn in the cluster, and node text nt contains selective quotes. If not, the control routine moves to decision box 1785. If so, the control routine moves to box 1750 where it initializes a set TEMP to empty, gets the first selective quote q in node text nt and moves to box 1760. At box 1760 the control routine estimates the importance i of selective quote q, which in this embodiment is the length of the nonquoting text following selective quote q in node text nt. Determining the importance of a selective quote might also, or alternatively, take into account other factors such as the lexical centrality of the quote in the cluster, the lexical centrality of the following text to the cluster or to the text of node n, whether the following text is itself quoted, and the extent to which the following text is actually related to the quote. The control routine then moves to box 1765. At box 1765 the control routine looks for a sentence s in the text associated with parent node qn matching the last sentence of selective quote q, and if it is found, adds the tuple < selective quote q, parent sentence s, importance i > to TEMP, and then moves to decision box 1770. At decision box 1770 the control routine checks whether there are any more selective quotes in node text nt and, if there are, moves to box 1775 where it gets the next selective quote q in node text nt and moves to box 1760. If the check in box 1770 determines that there are no more selective quotes in node text nt, the control routine moves to box 1780. At box 1780 the control routine selects one or more of the most important quotes <selective quote q, parent sentence s, importance i> of node n in TEMP and saves them in quoted set QD as < parent node qn, parent sentence s>, and in quoting set QG as <node n, selective quote q>, that is, it associates the selected quotes with both the quoted and the quoting nodes, and then the control routine moves to box 1785. At box 1785 the control routine checks whether there are any unprocessed nodes in extraction set EN, and, if so, moves to box 1790 to get the next node n in extraction set EN and its associated node text nt and then moves to box 1740. If at box 1785 the control routine determines that there are no more unprocessed nodes in extraction set EN it returns quoted set QD and quoting set QG.

Figure 18:
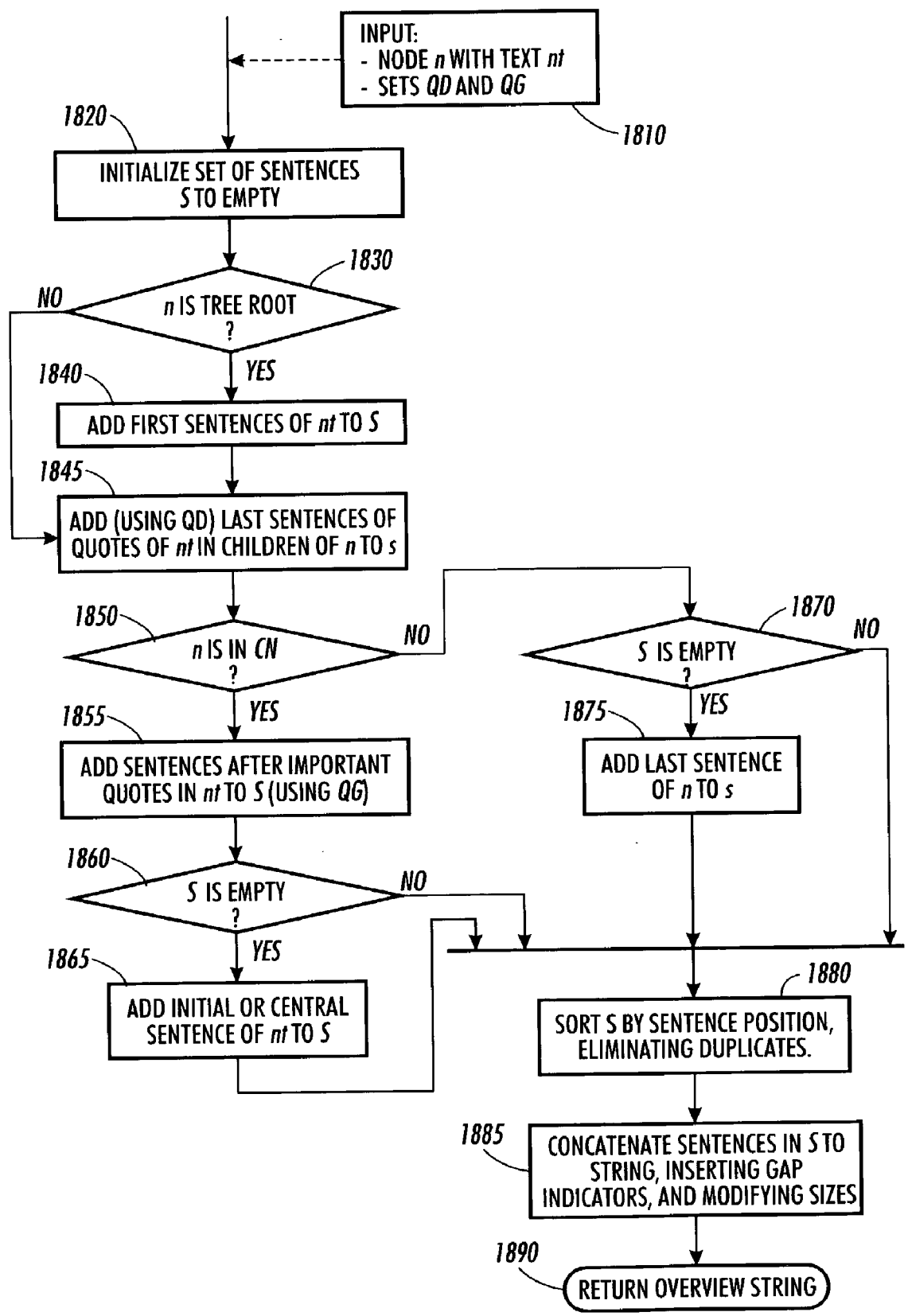
FIG. 18 is a flow diagram of the method for forming an overview string for a node.

FIG. 18, detailing box 1570 of FIG. 15, describes the method for forming an overview string for a single node, that is the string that will represent the node in the cluster overview. Box 1810 identifies the inputs to the method as (a) the node n with its associated node text nt, (b) the quoted set QD containing pairs of quoted sentences in the cluster and their source nodes, and (c) the quoting set QG containing pairs of quoting passages in the cluster and the quoting nodes. The control routine enters at box 1820 where it initializes to empty the set S of sentences to be used to represent the node n, and moves to decision box 1830 where it checks whether node n is the root of the entire tree. If it is, the control routine moves to box 1840 where it adds one or more initial sentences of nt to set S (depending on their lengths), and then moves to box 1845. If at box 1830 it is found that n is not the root of the tree, the control routine moves directly to box 1845. At box 1845 the control routine adds to sentence set S the sentences in node text nt which have been identified as sentences quoted elsewhere in an important way, that is, the sentences s where <node n, sentence s> is in quoted set QD. If the sentences are very short, then one or more prior sentences are added as well; if they are very long then they are truncated. After adding quoted sentences, the control routine moves to decision box 1850. At decision box 1850 the control routine checks whether node m is in the set of central nodes CM, that is, whether it is a central node of the cluster. If so, the control routine moves to box 1855. Otherwise the control routine moves to decision box 1870.

At box 1855, entered for central nodes, the control routine adds more sentences to sentence set S, specifically sentences following important quoting passages, that is, sentences immediately following quoting passages node n, selective quote q> recorded in quoting set QG. If a sentence s to be added is very short, then one or more sentences following s in node text nt are added as well. If a sentence to be added is very long, it may be truncated. After adding sentences following quoting passages, if any, at box 1855, the control routine moves to decision box 1860. At decision box 1860 the control routine checks if any sentences have yet been added to sentence set S. If sentence set S contains some sentences, the control routine moves to box 1880. Otherwise, the control routine moves to box 1865 where it adds to sentence set S either the first sentence in node text nt, or the sentence in node text nt having a word vector that is closest to the word vector for node text nt as whole, and then the control routine moves to box 1880

At decision box 1870, entered for non-central (auxiliary) nodes, the control routine checks whether sentence set S is still empty. If so, it moves to box 1875 where it adds the last sentence of node text nt to S, making the assumption that if there are no explicit quotes of node n, then responses to node n probably relate to the last sentence. If the last sentence s of node text nt is very short, then one or more sentences preceding sentence s in node text nt are added as well; if sentence s is very long it may be truncated. After the last sentence or sentences of node text nt have been added to S at box 1875, the control routine moves to box 1880.

At box 1880 the control routine sorts the sentences in sentence set S by their position in node text nt and eliminates duplicates, and then moves to box 1885. At box 1885 the control routine concatenates the sentences in sentence set S to form the string representing node n in the overview. Sequences of sentences in node text nt but not in sentence set S are represented in the string by gap markings such as ellipsis symbols " . . . ". The control routine then returns the overview string for node n at box 1890.

Figure 19:
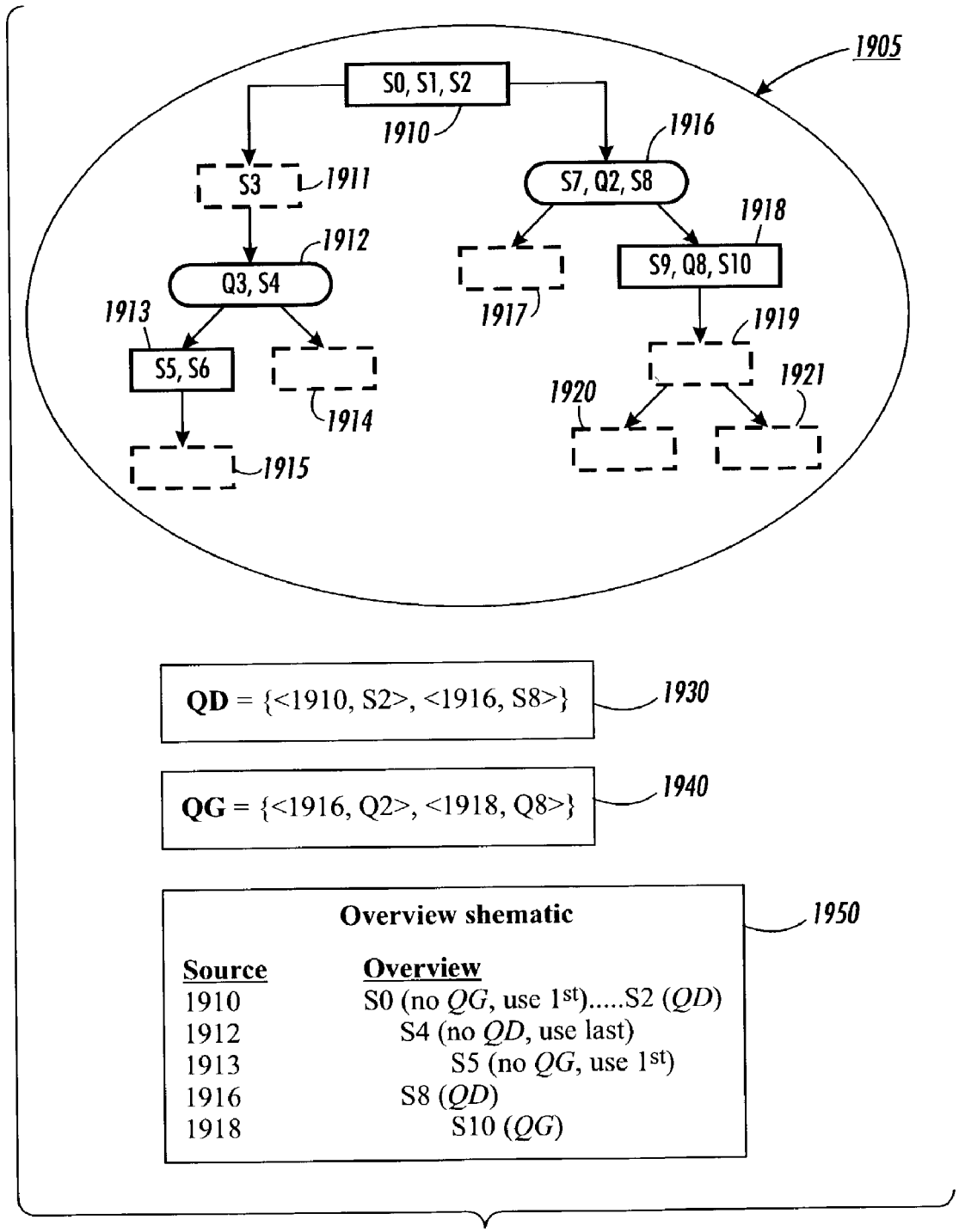
FIG. 19 illustrates the overview generation process.

FIG. 19 illustrates the cluster overview generation process for an example cluster 1905. Cluster 1905, which is assumed to represent a subtree of a larger tree, contains nodes 1910, 1911, 1912, 1913, 1914, 1915, 1916, 1917, 1918, 1919, 1920, and 1921. In the example, the lexically central nodes of the cluster are represented by rectangles with solid outlines, and comprise nodes 1910, 1913, and 1918. The auxiliary nodes, which in this case are all predecessors of central nodes, are indicated by ellipses, and comprise nodes 1912 and 1916. Nodes of the cluster that will not be represented by sentences in the overview are indicated by rectangles with dashed outlines, and comprise nodes 1911, 1914, 1915, 1917, 1919, 1920, and 1921. The sentences associated with central and auxiliary nodes are listed within the nodes, and distinguished as to whether they represent original material or quotes of a parent. For example, central node 1910 contains three sentences, S0, S1, and S2, in that order, and all represent original material. Auxiliary node 1916 contains original sentence S7, followed by quote Q2 of sentence S2 of node 1910, and then original sentence S8.

Quoted set 1930 shows the quoted set QD obtained after analyzing the quote interactions of the cluster. It contains two pairs: <1910, S2> and <1916, S8>, indicating when extracting sentences for use in representing node 1910, sentence S2 will be included, and that when extracting sentences representing node 1916, sentence S8 will be included. Similarly, the quoting set 1940 shows the quoting set QG after analyzing the quote interactions. It contains the two pairs <1916, Q2> and <1918, Q8>, indicating that quote Q2 of node 1916, and quote Q8 of node 1918, are considered to be important quotes, and that sentences following them in their containing nodes might, although not necessarily, be included in the overview.

The overview schematic 1950 shows the overview that would result from the central and auxiliary node identification together with quote interaction analysis. The schematic lists the sentences that would be included in the overview, the nodes from which they are extracted, and a brief rationale for their inclusion. As in an actual overview, sentences are concatenated into strings representing their source nodes, with ellipsis symbols " . . . " indicating gaps, and the strings are arranged in an indented tree reflecting the structure of the cluster. Thus node 1910, which is a central node, is represented in the overview by two sentences, S0 and S2. The first sentence SO is used because 1910 is a central node, and there is no entry for 1910 in quoting set QG. Sentence S2 is used because it is represented in quoted set QD. Node 1916, which is an auxiliary node, is represented in the overview by sentence S8, which is represented in quoted set QD. And node 1918, which is a central node, is represented by sentence S10, because it follows a quote represented in quoting set QG.

Figure 20:
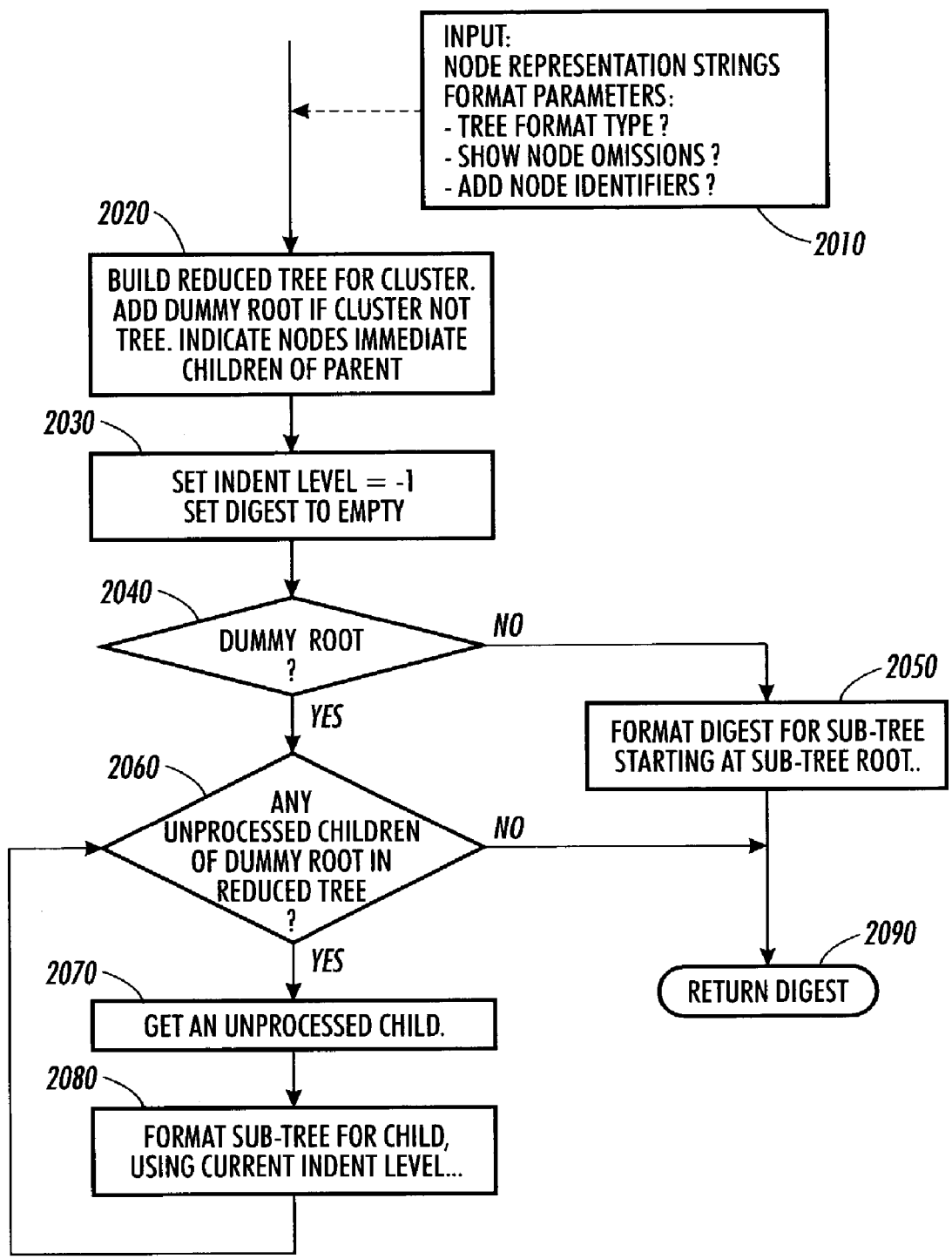
FIG. 20 is a flow diagram of the method for formatting a cluster digest
Figure 21:
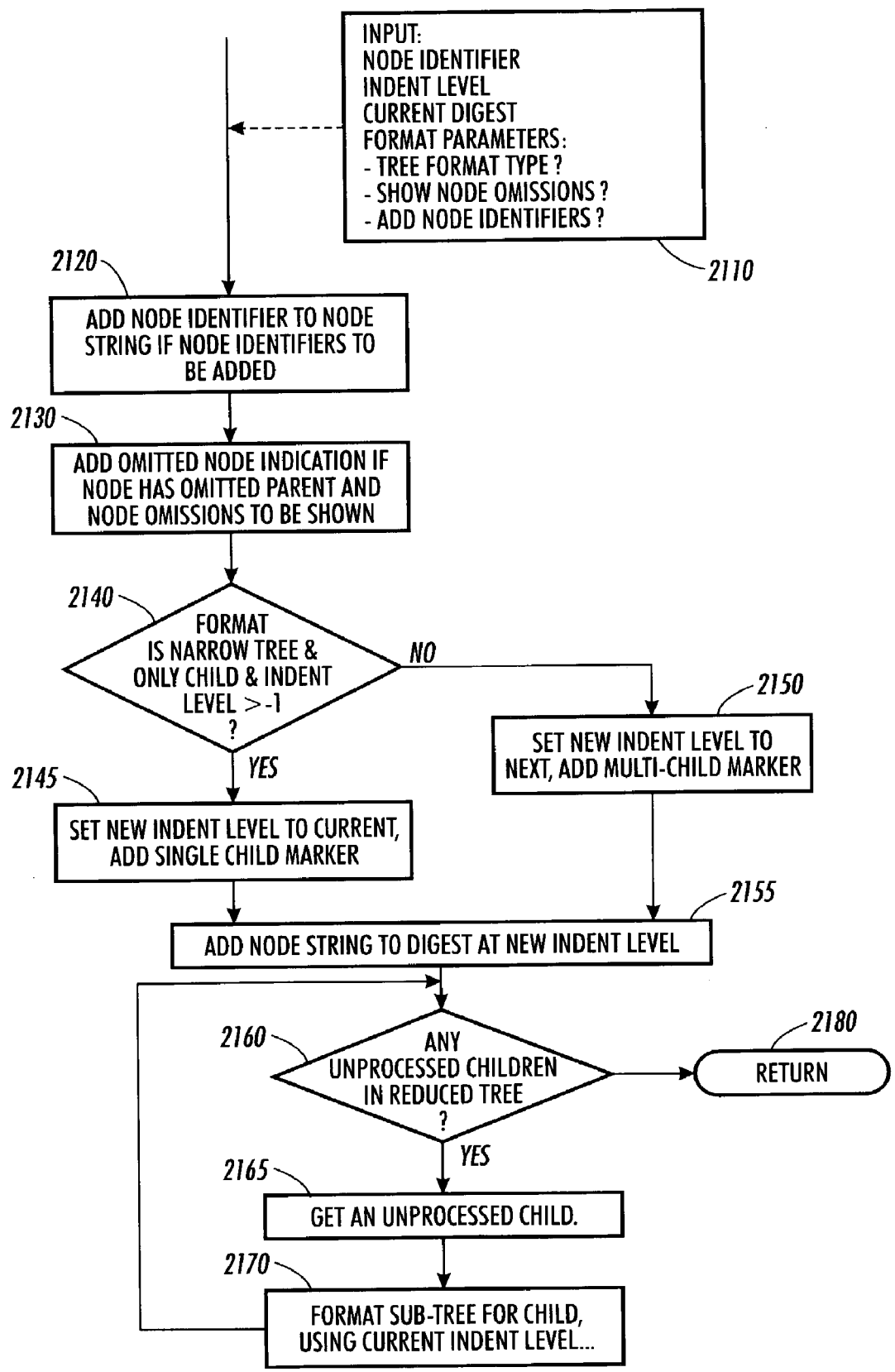
FIG. 21 is a flow diagram of the method for formatting a digest for a subtree.
Figure 23:
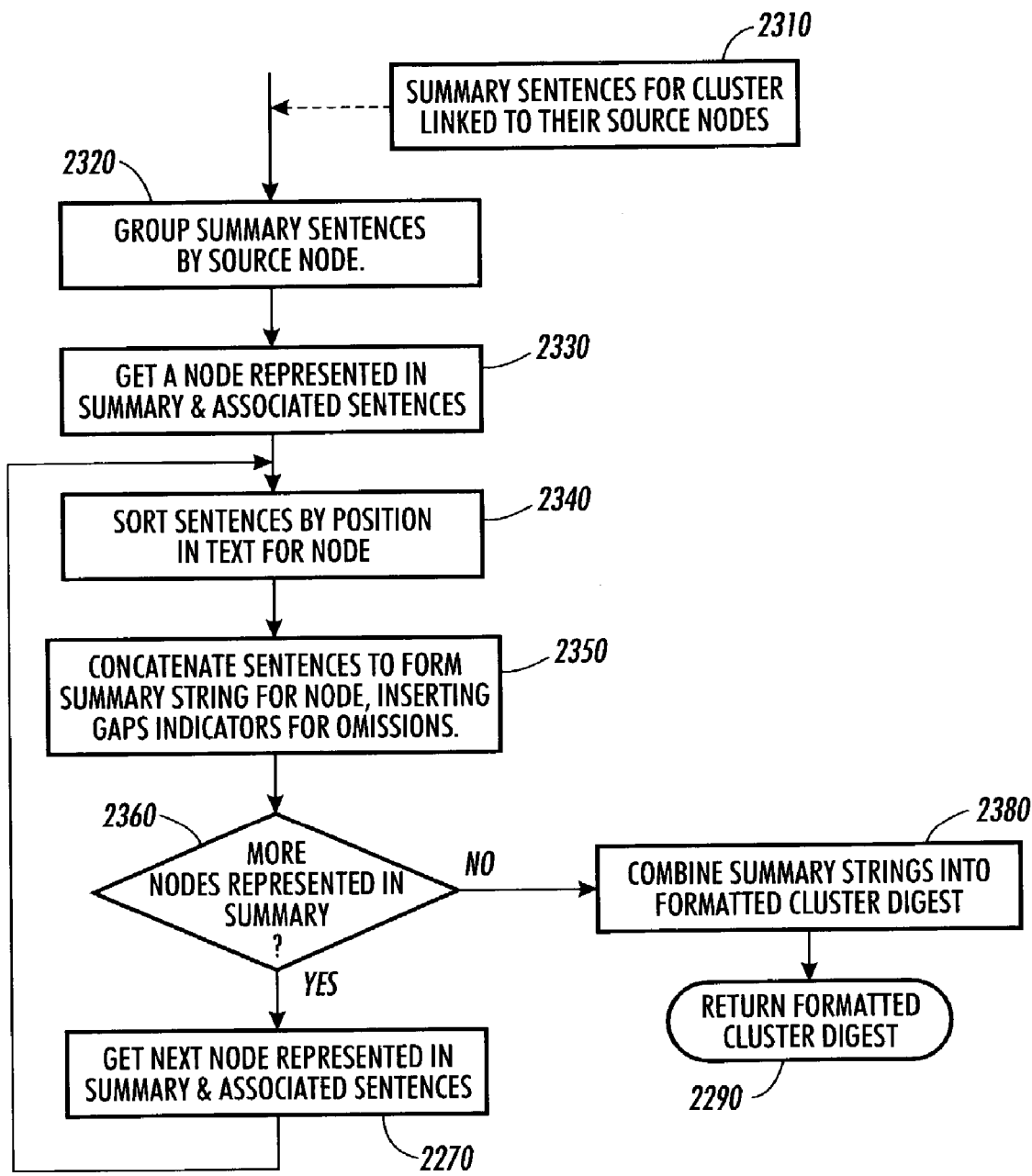
FIG. 23 is a flow diagram of the method for formatting a cluster summary

FIGS. 20 and 21, detailing the processing of boxes 1590 of FIG. 15, and 2380 of FIG. 23, describe the method of constructing a cluster digest from a set of node representation strings, which may be overview or summary strings, for a collection of related nodes within a cluster. FIG. 20 describes the initialization part of the method. Box 2010 indicates the input to the method, comprising the nodes, and their representation strings, to be included in the digest, and a collection of formatting parameters. The formatting parameters indicate the kind of tree representation to be used in formatting, which may be a classic indented tree, as shown in FIG. 4, or an adaptation, shown in FIG. 1, of the reduced-width trees described in U.S. patent application Ser. No. 09/732,028, now U.S. Pat. No. 6,683,632, titled "Method and System for presenting semi-linear hierarchy displays" by Paula Newman, incorporated by reference hereinabove. This representation does not indent children under their parents unless there are multiple children, instead using a no-sibling indicator, as described with respect to FIG. 1 hereinabove. This avoids deep indentation of nested strings, and allows convenient, down-the-page reading. The formatting parameters also specify whether some identification information is to be included in the node representation strings for each node, and whether the omission of node representatives on paths between represented nodes is to be indicated in the cluster digests.

The control routine enters at box 2020 where it builds a reduced tree for the cluster containing only the nodes to be represented in the digest. In the reduced tree, a) The parent of a node is its closest ancestor also to be represented in the digest.

b) If the real parent of a node in the digest is not also in the digest, the number of ancestors skipped is indicated.

c) If the cluster is not a true subtree, but rather, a collection of subtrees whose roots have the same parent, which is not a member of the cluster, a dummy subtree root node is added.

The control routine then moves to box 2030 where it initializes the indent level to (−1), and the digest to empty. The control routine then moves to decision box 2040 where it checks whether the cluster has a dummy root node. If so, it moves to decision box 2060. Otherwise, it moves to box 2050, described in more detail with respect to FIG. 21, where it formats the digest for the subtree rooted in the subtree root, and then moves to box 2090.

At decision box 2060 the control routine checks whether the dummy subtree root node has any remaining unprocessed children in the reduced tree. If not it moves to box 2090. Otherwise, it moves to box 2070 where it gets an unprocessed child and moves to box 2080. At box 2080, described in more detail with respect to FIG. 21, the control routine formats the digest for the subtree rooted in the unprocessed child, and adds it to the cluster digest, and then moves to box 2060.

At box 2090 the control routine returns the completed cluster digest.

FIG. 21, detailing the processing of boxes 2050 and 2070 of FIG. 20, describes the method for formatting that part of a cluster digest associated with a particular subtree. It is a recursive method, used once for each node represented in the digest. Box 2110 describes the input to the method, comprising the subtree root node, an indentation level, the content of the digest accumulated so far, and the formatting parameters described with respect to box 2010 of FIG. 20 hereinabove. The control routine enters at box 2120 where if node identifiers are to be added, it adds a node identifier, such as the name of the author of a text, to the string representing the node in the digest. The control routine then proceeds to box 2130 where if node omissions are to be shown, and the parent of the current node is not in the reduced tree, it adds an indication of node omissions between the digest parent and the current node The control routine then moves to decision box 2140 where it checks whether (a) The specified format is a reduced-width tree, and (b) The node has no siblings in the reduced tree, and (c) The current indent level is larger than −1, that is, the node is neither the root of the cluster nor a child of the dummy root.

If so, the control routine moves to box 2145 where it sets the new indent level equal to the input indent level, which will result in the current node not indented under its parent, and adds a no-sibling indicator to the node representation string, and then moves to box 2155. However, if at decision box 2140 the control routine determines that the node is not a child without siblings in a reduced-width tree format, or the current indent level is −I, it moves to box 2150 where it sets the new indent level as one more than the current indent level, adds a sibling indicator, for example, a solid bullet as shown by sibling indicator 129 in FIG. 1, and then moves to box 2155.

At box 2155 the control routine adds the node representation string to the digest, indenting some multiple of the new indent level, and moves to decision box 2160. At decision box 2160 the control routine checks whether the current node has any unprocessed children in the reduced tree, and, if not, moves to box 2180 where it returns. Otherwise the control routine moves to box 2165 where it gets an unprocessed child of the current node and moves to box 2170. At box 2170 the control routine formats the part of the digest for the subtree headed by the unprocessed child node, recursively invoking the current process from box 2110. When the recursively invoked execution of the current process returns, the control routine moves to box 2160.

FIGS. 22 through 26 describe the process of forming a cluster summary from box 1450 of FIG. 14 according to one embodiment of this invention. The general approach of selecting sentences for a summary by a set of features scoring their relationship to central topics, their document positions, and their lexical and positional relationships to other candidate sentences have been used in other summarization processes, such as the process described in a paper by D. Radev, H. Jing, and M. Budzikowska titled "Centroid-based summarization of multiple documents: sentence extraction" i in the *Proceedings of the ANLP/NAACL 2000 Workshop on Automatic Summarization* (Seattle, Wash., April 2000) pages 21–29, and the multi-stage process described in a paper by M. White and C. Cardie entitled "Selecting sentences for multi-document summaries using randomized local search", in. the proceedings of the ACL 2002 Summarization Workshop. The latter multi-stage process is a fairly complex one, with the final iterative stage making random additions to and deletions from the summary. The process described in FIGS. 23 through 26 is unique in that the specific features used in the scorings are adapted to the scoring of sentences from tree-structured texts, and the multi-stage process employed is a direct one finding the best sentence to add to a summary at each point.

Figure 22:
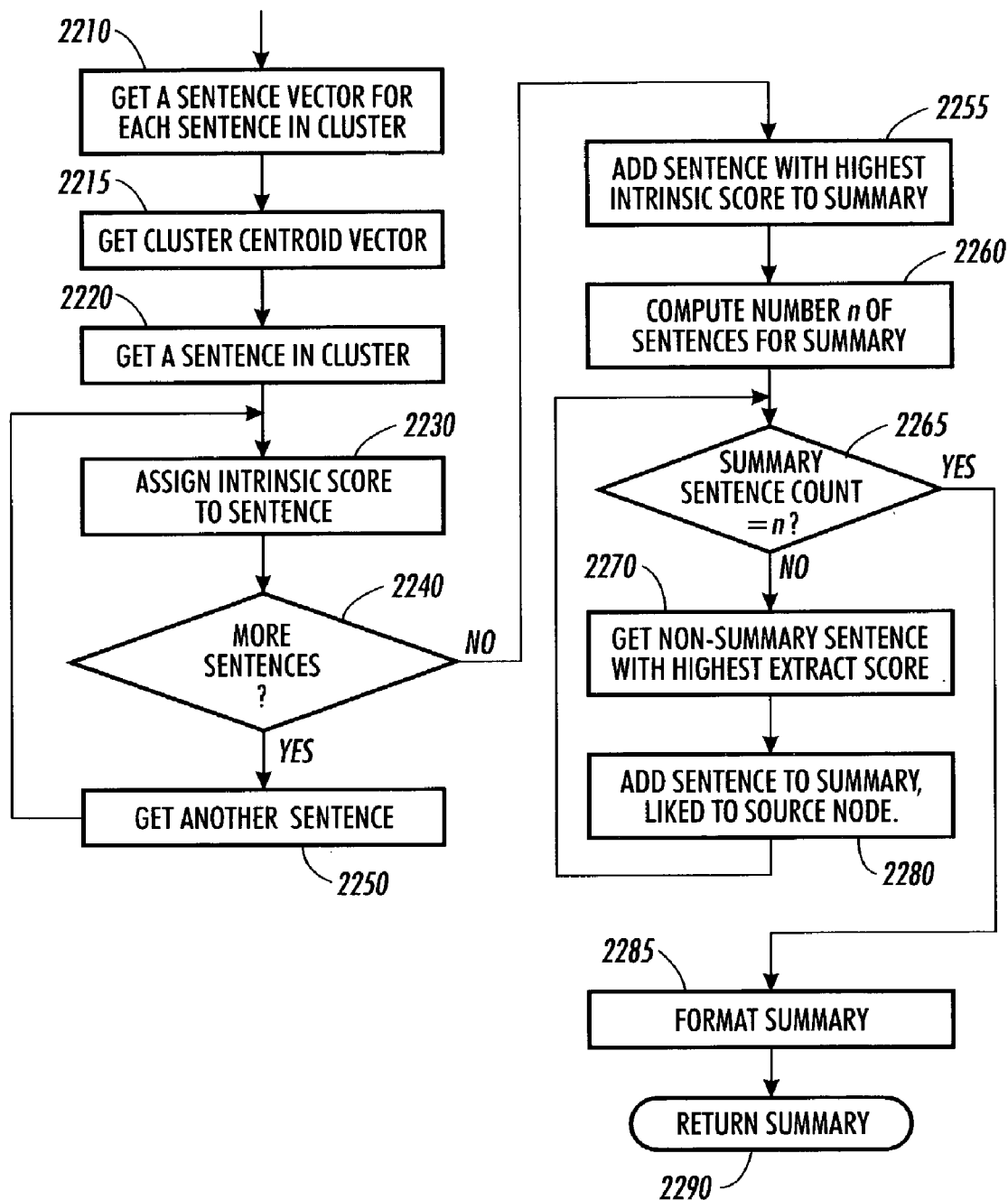
FIG. 22 is a flow diagram of the method for forming a cluster summary.

FIG. 22, detailing the process of box 1450 of FIG. 14, describes the overall method of obtaining a cluster summary. The control routine enters at box 2210 where it obtains a vector to represent each sentence in the cluster in one of two ways. One comprises using standard methods, including stemming, deleting stop words, and tf.idf-based weighting, to obtain sentence word vectors. Alternatively, because sentences are much shorter than the entire texts used as the basis for clustering and extracting overviews described hereinabove, the results benefit from training a PLSA model beforehand on large amounts of text, for example, all messages of a discussion list over a period of several months, and then "folding in" the word vector for a sentence to obtain a sentence vector that describes a probability distribution over a set of latent semantic classes z for the sentence:

$$\vec{s} = \langle p(z_1|s), p(z_2|s), \ldots, p(z_n|s) \rangle$$

That is, the sentence vector $\vec{s}$ consists of a set of components $p(z_i|s)$, each of which is a conditional probability of a class $z_i$ given sentence s. The PLSA training and folding in processes are described for the case of obtaining class probability distribution vectors for general documents by Thomas Hofmann in the paper titled "Probabilistic Latent Semantic Indexing", in *Proceedings of SIGIR '99* (Berkeley, Calif., August 1999) 50–57.

After obtaining sentence vectors for each sentence in the cluster in box 2210, the control routine moves to box 2215 where it obtains the centroid of the sentence vectors for the cluster, that is, a vector where each position contains the average of the values in that position across the cluster. The control routine then moves to box 2220 where it gets a sentence in the cluster, and moves to box 2230. At box 2230, described in more detail with respect to FIG. 24, the control routine assigns an intrinsic score to the sentence, reflecting lexical centrality and position features, and then moves to box 2240 where it checks whether there are any more sentences in the cluster. If so, the control routine moves to box 2350 where it gets another sentence, and then moves to box 2230. Otherwise the control routine moves to box 2255.

At box 2255 the control routine adds the sentence with the highest intrinsic score to the summary, and moves to box 2260. At box 2260 the control routine determines the number of sentences to be used in the summary. This is computed using an assumed percentage, usually 10%, and then using the larger of that percentage of the number of sentences in the cluster as a whole, and that percentage of the number of texts in the cluster times a nominal standard text size, whichever is greater. The control routine then moves to box 2265.

At box 2265 the control routine determines whether the summary contains the desired number of sentences. If so, it moves to box 2285. If not, the control routine moves to box 2270, described in more detail with respect to FIG. 25, where it gets the sentence not already in the summary with the highest extract score, a score that combines the intrinsic score with features relating the candidate sentence to sentences already in the summary. The control routine then moves to box 2280 where it adds the sentence with the highest extract score to the summary and then moves to box 2265.

At box 2285, described in more detail with respect to FIG. 23, the control routine formats the summary for the cluster, and then moves to box 2290 where it returns the summary for the cluster.

FIG. 23 details the process of box 2285 of FIG. 22, in which the cluster summary is formatted. Box 2310 describes the input to the method, comprising the sentences to be included in the summary, and their associated source nodes. The control routine enters at box 2320 where it sorts the sentences into groups, with each group containing the sentences associated with a particular node of the cluster. It then moves to box 2330 where it gets a node to be represented in the summary and its associated summary sentences, and moves to box 2340. At box 2340 the control routine sorts the sentences for the current node by their position in the text associated with the node, and then moves to box 2350. At box 2350 the control routine concatenates the sorted sentences into a string to represent the node in the summary, inserting gap indicators, for example ellipsis symbols " . . . ", to represent sequences of sentences in the text for the node not included in the summary. The control routine then proceeds to decision box 2360 where it checks whether there are any more nodes to be represented in the cluster summary and, if so, moves to box 2370 where it gets another node to be represented in the summary and moves to box 2340. However, if at decision box 2360 the control routine determines that there are no more nodes to be represented in the summary it moves to box 2380. At box 2380, described in more detail with respect to FIG. 20, the control routine combines the summary strings for the cluster nodes into a formatted cluster digest, and then moves to box 2390 where it returns the formatted digest.

Figure 24:
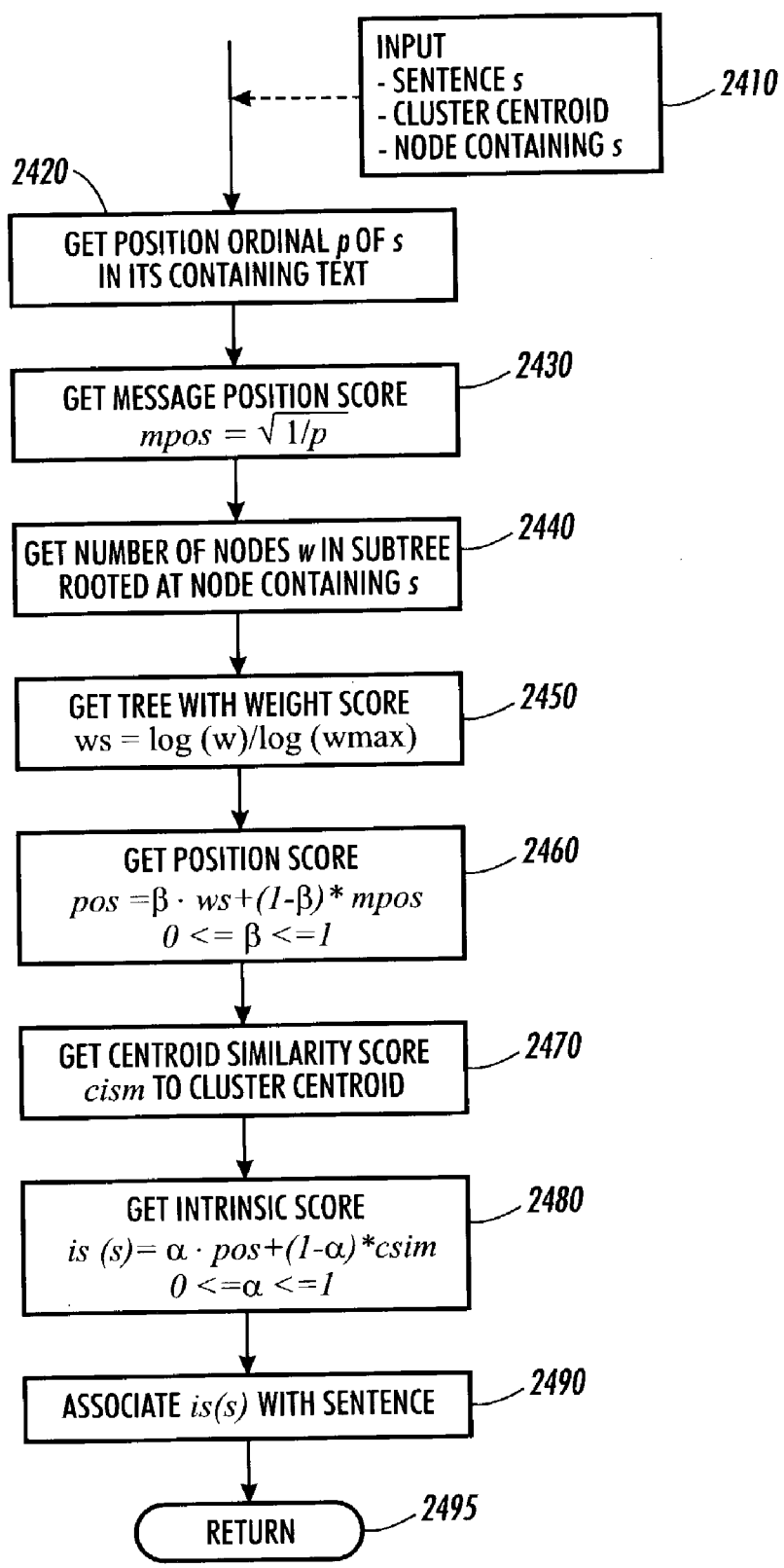
FIG. 24 is a flow diagram of the method for assigning an intrinsic score to a sentence.

FIG. 24 details box 2230 of FIG. 22, in which an intrinsic score is assigned to a sentence in a cluster. The intrinsic score assigned to a sentence is based on the position of the sentence in its containing text, the position of its containing node in the cluster, and the lexical centrality of the sentence in the cluster. Box 2410 indicates the input to the process as including the input sentence s, the lexical centroid for the cluster, and the node of the tree containing sentence s. The process comprises assigning a score to the sentence based on a combination of features. The control routine enters the process at box 2420, where it determines the ordinal position p of the sentence in its containing text. Then control routine then moves to box 2430 where it obtains a message position score mpos of the sentence. In one embodiment the position score is obtained as the square root of 1/p. The control routine then moves to box 2440 where it finds the descendant node count w, counting the nodes of the tree that are descendants of the node containing sentence s. The control routine then moves to box 2450 where it finds the "tree weight score" ws, which in one embodiment is computed as the log to the base 10 of descendant node count w, divided by the log to the base 10 of the maximum number of nodes descended from any node in the cluster wmax. The control routine then moves to box 2460 where it computes an overall position score pos for sentence s. In one embodiment the overall position score pos is computed as a weighted sum of the message position score mpos and the tree weight score ws as $$pos = \beta * ws + (1-\beta) * mpos$$

Where $\beta$ is a present parameter between 0 and 1.

The control routine then moves to box 2470 where it computes a centroid similarity score csim for the sentence, measuring its similarity to the cluster centroid. This is computed differently depending on whether the sentence vectors are simple word vectors, or PLSA-based class probabilities. In the former case the similarities are (1–distance), where the distance is the absolute value of the cosine of the angle between the word vector and the lexical centroid for the cluster. In the case where the vectors represent PLSA class probabilities, the similarity is the Hellinger similarity between vectors. The control routine then moves to box 2480 where it computes the overall intrinsic score is(s) for the sentence s as the weighted sum of the overall position score pos and the centroid similarity score csim using is(s)=$\alpha$*pos+(1–$\alpha$)*sim, where a is between 0 and 1. Then control routine then moves to box 2490 where it associates the computed intrinsic score with the sentence, and then moves to box 2495 where it returns.

Figure 25:
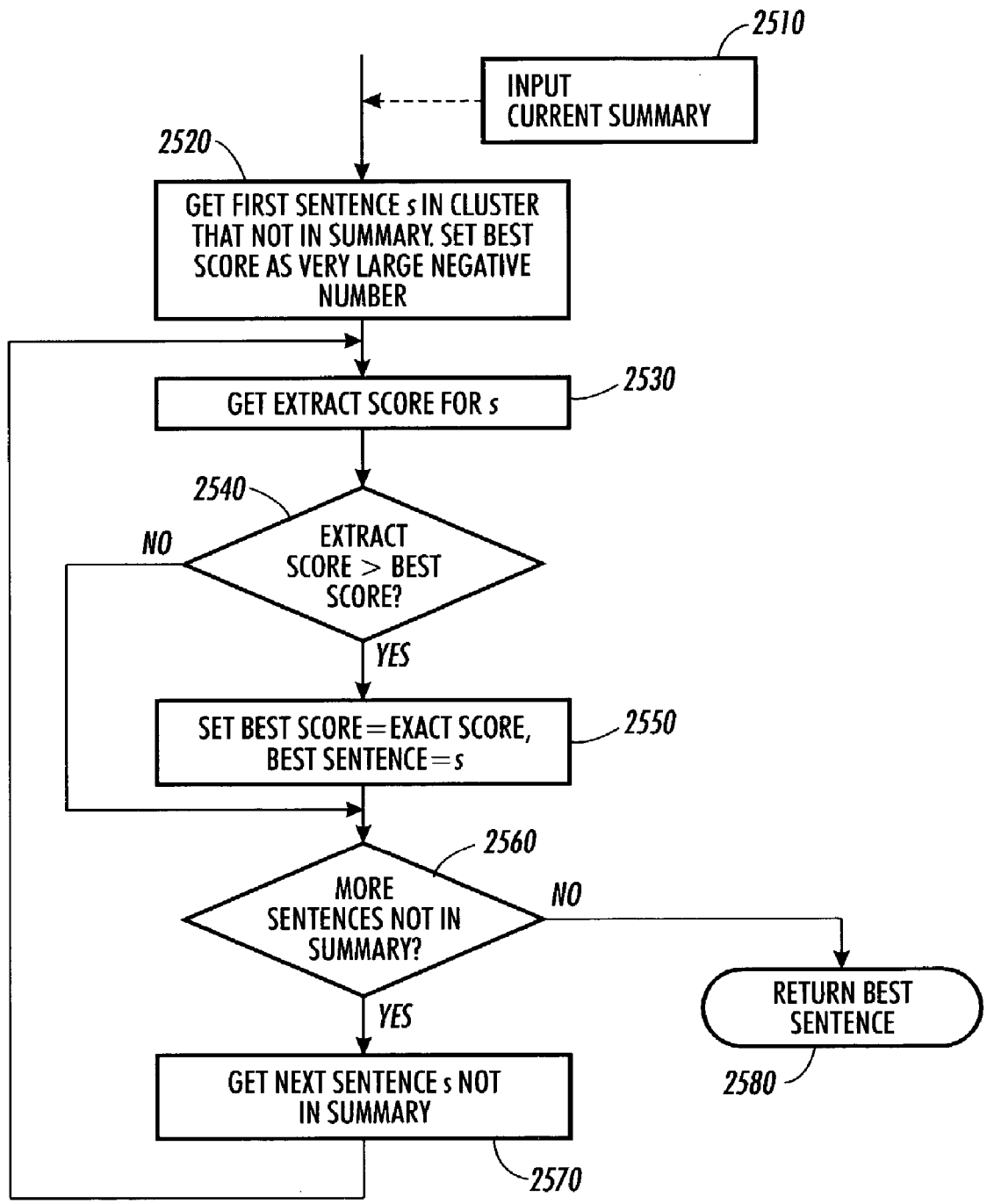
FIG. 25 is a flow diagram of the method for finding the best addition to a summary.

FIG. 25, detailing box 2270 of FIG. 22, describes the process for finding the best sentence to add to the summary at a given point in its development. Box 2510 represents the input, comprising the sentences in the current summary. The control routine enters at box 2520 where it initializes the process by setting the best score to a very low number, such as a large negative number, so that any score will be better, and gets the first sentence in the cluster not already in the summary. The control routine then moves to box 2530, described in detail with respect to FIG. 26, where it gets the extract score for the sentence, namely the intrinsic score combined with features concerning the relationship of the sentence to the current summary, and then moves to box 2540. At box 2540 the control routine determines whether the current extract score is greater than the best score. If not, it moves to box 2560. If so, the control routine sets the best score to the current extract score, and the best sentence to the current sentence, and then moves to box 2560. At box 2560 the control routine checks whether there are more sentences not already in the summary, and, if so, moves to box 2570 where it gets the next sentence in the cluster not already in the summary and moves to box 2530. Otherwise the control routine moves to box 2580 where it returns the best sentence.

Figure 26:
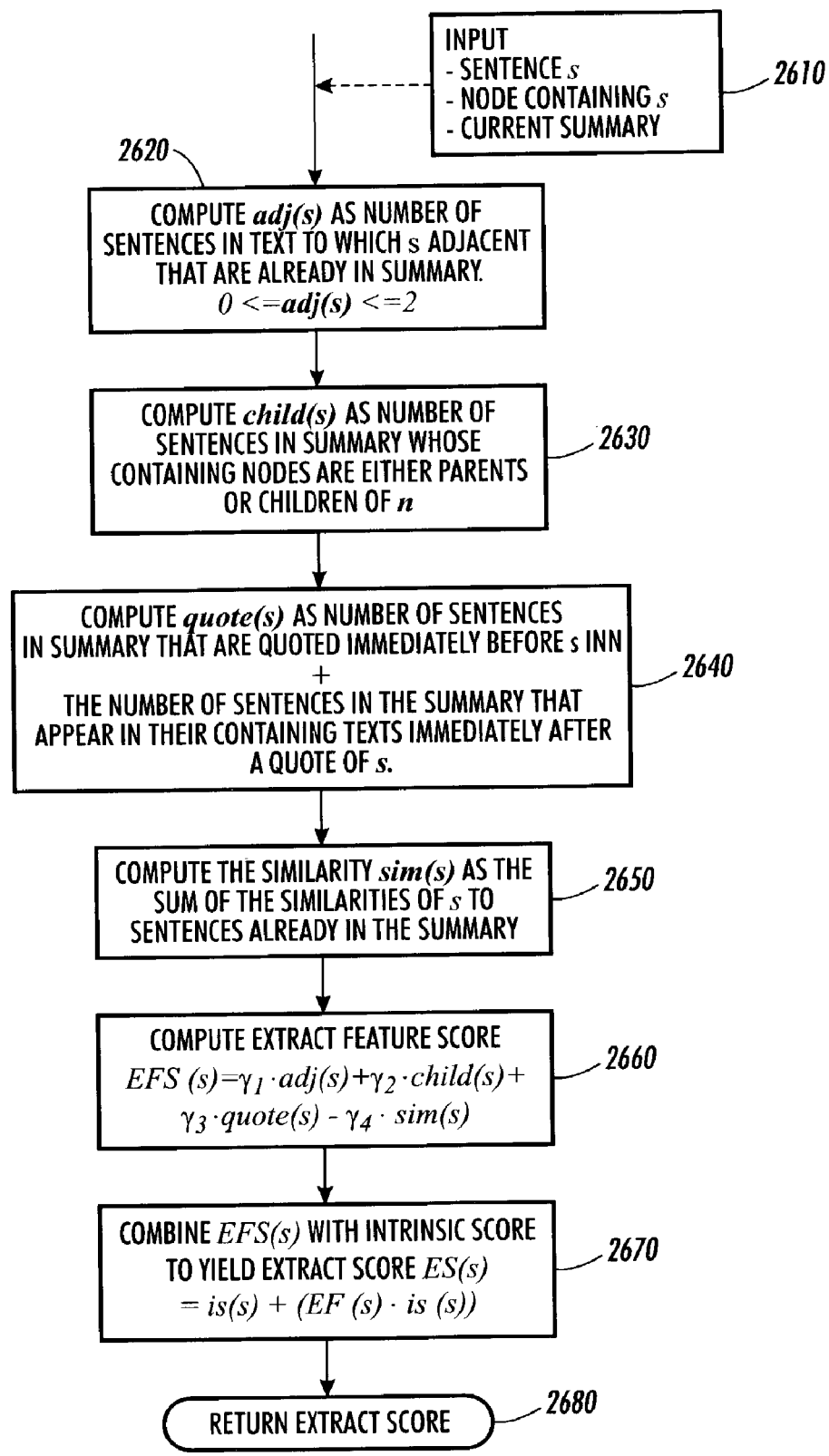
FIG. 26 is a flow diagram of the method for computing an extract score for a sentence.

FIG. 26, detailing box 2530 of FIG. 25, describes the process of obtaining an extract score for a sentence by combining the intrinsic score with features reflecting n the relationship of the sentence to sentences already in the summary. Box 2610 represents the inputs to the process, including the sentence s to be scored, the node n in the tree containing the sentence, and the current summary. The control routine enters at box 2620 where it computes the adjacency score adj(s) for sentence s as the number of nonquoting sentences in the summary to which sentence s is adjacent. The adjacency score has a maximum value of 2 (the sentence before sentence s in its containing text, and the sentence after it). The control routine then moves to box 2630 where it computes the child score child(s) as the number of sentences in the summary whose associated nodes are either parents or children of node n. The control routine then moves to box 2640 where it computes the quote score quote(s) counting the number of sentences in the summary that are quoted immediately before sentence s (which must be 0 or 1), and the number of sentences in the summary that appear immediately after a quote of sentence s. The control routine then moves to box 2650 where it computes the sentence similarity sim(s) as the sum of the Hellinger similarities of the sentence to sentences already in the summary. The control routine then moves to box 2660 where it computes an overall extract feature score EF(s) for the sentence in one embodiment by combining the adjacency score adj(s), the child score child(s), the quote score quote(s) and the sentence similarity score sim(s). In one embodiment these scores are combined as the weighted sum EF(s) =y1*adj(s)+y2*child(s)+y3*quote(s)–y4*sim(s). Note that the sentence similarity sim(s) is negatively weighted, as redundancy with material already in the summary is an undesirable feature. The control routine then moves to box 2670 where it computes the extract score ES(s) for sentence s by combining its intrinsic score with the extract feature score. In one embodiment the intrinsic score is combined with the extract feature score by the formula ES(s)=is(s)+ (is(s)*EF(s)). The control routine then moves to box 2680 where it returns the extract score E(s).

Figure 27:
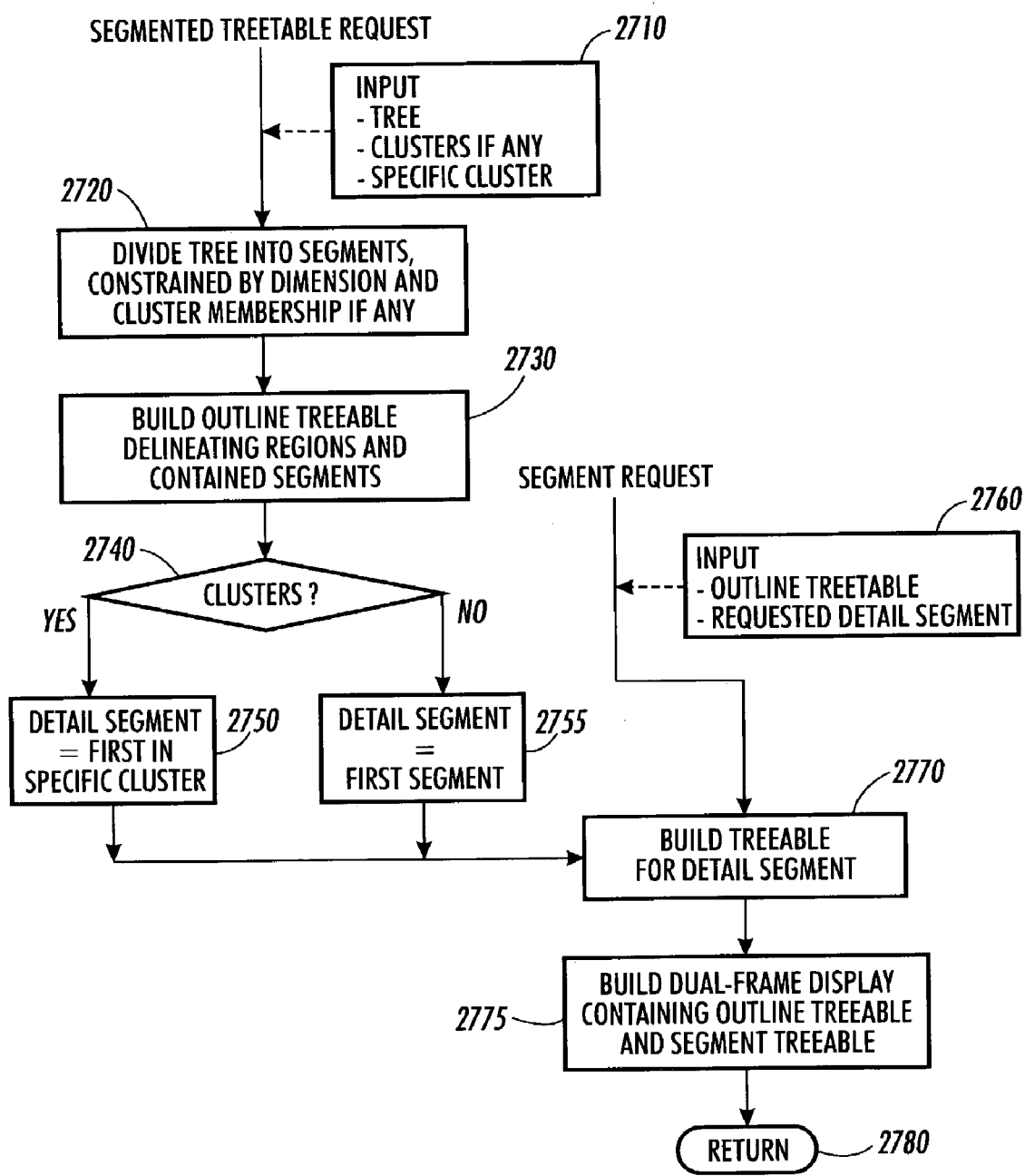
FIG. 27 is a flow diagram of the method for building a segmented treetable display

FIGS. 27 through 32 describe the method of building a segmented treetable display, as illustrated in FIGS. 5, 6, and 7, and 8, comprising an outline treetable and also a display of a treetable for a selected segment. FIG. 27, which details box 980 of FIG. 9, describes the overall process of building a segmented treetable display. It is entered at two points, the first when the outline has not yet been built, and the second when it has been built, and there is a need to display another selected segment. The process can be used whether or not subtopic-clusters have been identified. Box 2710 indicates the input for the entry before outline has been built, and comprises the tree, clusters if they have been identified, and, if so, a particular cluster for which a detail segment is to be displayed. When the outline has not yet been built, the control routine enters at box 2720, described in detail with respect to FIG. 28, where it partitions the tree into detail segments such that treetables for the individual segments will permit the inclusion of significant amounts of text. The control routine then moves to box 2730, described in detail with respect to FIG. 29, where it builds an outline treetable for the tree as a whole, delineating the segments found, and, if clusters have been specified, associating segments with their containing, cluster-based regions. The control routine then moves to decision box 2740 where it checks whether clusters have been identified for the tree. If so, it is assumed that the input has specified a cluster from which a segment is to be displayed, and the control routine moves to box 2750 where it sets the detail segment to be displayed as the first segment in that cluster, and moves to box 2770. However, if at box 2740 it is determined that clusters have not been identified for the tree, the control routine moves to box 2755 where it sets the detail segment to be displayed as the topmost segment, and the moves to box 2770.

Box 2760 describes input to the process when entered when the outline treetable has already been developed, and a particular segment is to be displayed in conjunction with the outline table, probably because of a link from the outline table. The input comprises the outline treetable and an indication of the detail segment to be displayed. The control routine, when entered to obtain a detail segment table associated with an existing outline table, enters at box 2770. At box 2770 the control routine builds a treetable for that portion of the tree composed of nodes in the specified detail segment, plus possibly one additional node for any segment containing children of nodes in the specified detail segment. The treetable is built using essentially the same method as that used to build a full treetable, as described in the U.S. patent application described in U.S. Pat. No. U.S. patent application Ser. No. 09/954,388, still pending, titled "Method and Apparatus for the Construction and use of Table-like visualizations of Hierarchic Material, by Paula Newman and Stuart Card, included by reference hereinabove, differing in that the background of the detail segment treetable is set to the same background as that used for the segment in the outline treetable. An example of the result is illustrated in FIG. 8. After building a detail segment treetable in box 2770, the control routine moves to box 2775 where it constructs a two-frame display, with the upper half containing the outline treetable, and the lower half the detail segment treetable, and then moves to box 2780 where it returns.

Figure 28:
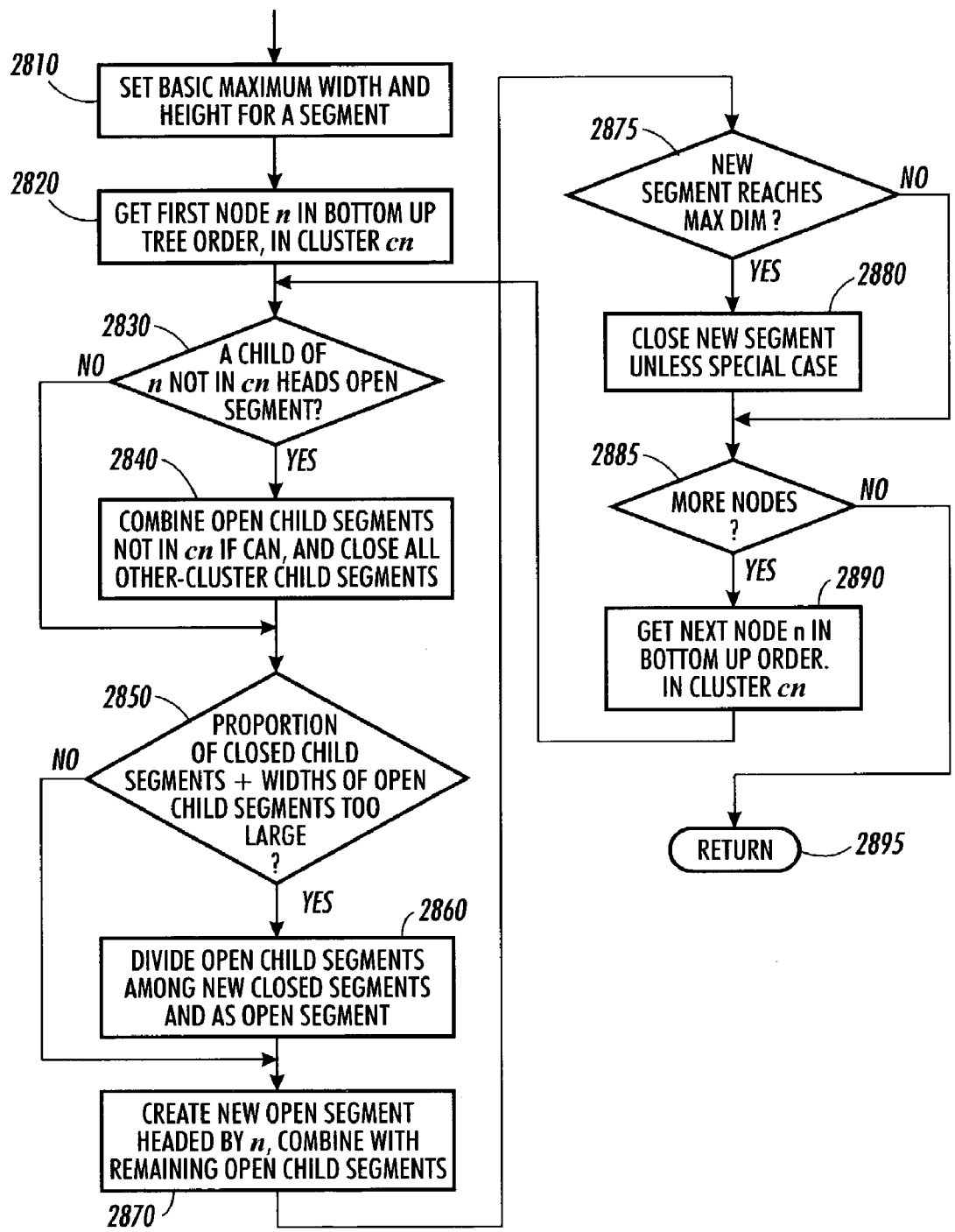
FIG. 28 is a flow diagram of the method for dividing a tree into segments

FIG. 28 details the process of box 2720 of FIG. 27, in which a tree is partitioned into segments that can be represented as individual treetables small enough, in terms of row and column dimensions to contain useful amounts of text, and to be further explored conveniently. The basic partitioning is done by an algorithm that accumulates nodes into segments in a bottom-up traversal of the tree (a traversal such that all children of a parent are processed before the parent), not permitting segments to contain nodes from more than one cluster, and attempting to obtain segments of minimally varying widths within a cluster. The control routine enters at box 2810 where it sets the basic maximum dimensions for a segment, with the width and height specified in terms of the number of columns and rows required to represent the segment in a detail segment treatable. These dimensions may be exceeded when doing so will avoid the creation of many small segments. The control routine then moves to box 2820 where it gets the first node n in a bottom-up order of the tree, and gets its associated cluster cn. If clustering has not been done, the associated cluster is assumed to be cluster 0. The control routine then moves to decision box 2830 where it checks whether node n has one or more children not in cluster cn that head currently "open" segments. If not, the control routine moves to decision box 2850. If so, the control routine moves to box 2840 where it attempts to combine currently open child segments in clusters other than cluster cn into larger single-cluster segments, and then closes all child segments in clusters other than cluster cn. The control routine then moves to decision box 2850. At decision box 2850 the control routine checks whether a proportion of the number of closed segments plus the combined widths of the currently open segments headed by children of node n exceed the maximum width for a segment. (A proportion of the number of closed segments is used because such segments may be represented by small cells in the detail segment treetable for the new segment being created). If not, it moves to box 2870. If so, the control routine moves to box 2860 where it attempts to partition the remaining open segments among new closed segments, and the current new segment, so that widths of the result segments (as seen in the detail segment treetables) will vary minimally.

At box 2870 the control routine combines the current node n with the content of any open segments. If node n has no children, the width of the resulting segment is 1 and its height is 1. If there are open child segments, the width of the resulting segment is a proportion of the number of its closed child segments plus the widths of remaining open segments, and its height is the maximum of the heights of the remaining open segments plus one. The control routine then moves to decision box 2875. At decision box 2875 the control routine checks whether the new segment exceeds the maximum dimensions for a segment. If not, the control routine moves to decision box 2885. Otherwise, the control routine moves to box 2880 where it closes the new segment unless doing so would foster some very small segments. Two such cases are (1) where the height dimension has been reached and there are very few nodes in the same cluster above the current one in the tree, and (2) where the width dimension has been reached but the current node has siblings in the same cluster. In the latter case the decision of whether to close the current segment is left to processing at higher node levels. The control routine then moves to decision box 2885.

At box 2885 the control routine checks whether there are more nodes in the bottom-up ordering of the tree. If not, the control routine returns at box 2895. Otherwise, the control routine moves to box 2890 where it gets the next node n in the ordering and moves to box 2830.

Figure 29:
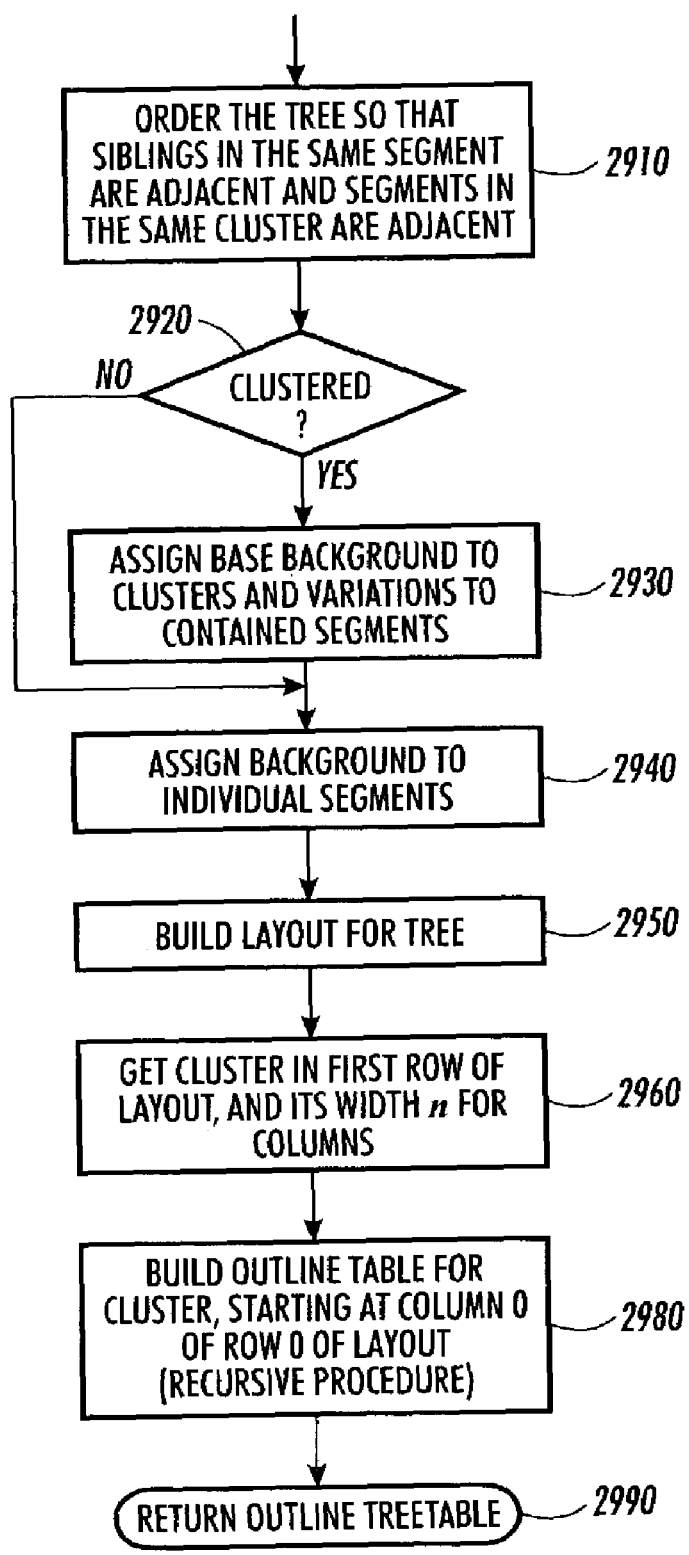
FIG. 29 is a flow diagram of the method for building an outline treetable for a tree

FIG. 29, which details box 2730 of FIG. 27, describes the method of building an outline treetable, an example of which, for trees containing more than one region, is shown in the upper frame of FIG. 4. The control routine enters at box 2910 where it orders the tree, by ordering the children of each node, so that siblings in the same cluster are adjacent and siblings in the same segment are adjacent, and then moves to decision box 2920 where checks whether the tree has been clustered. If so, it moves to box 2930 where it assigns a base background to each cluster, and a variation of that background to each segment in the cluster. For example, it might assign a particular color to each cluster, and then a shade of that color to each segment. The control routine then moves to box 2950. If, however, at decision box 2920 it is found that the tree has not been clustered, the control routine moves to box 2940 where it simply assigns a different background (e.g., a different color) to each segment, and moves to box 2950. At box 2950 the control routine obtains a basic treetable layout for the entire tree. An example of a resultant basic layout is described with respect to FIG. 30. The layout is obtained as described in U.S. Pat. No. U.S. patent application Ser. No. 09/954,388, titled "Method and Apparatus for the Construction and use of Table-like visualizations of Hierarchic Material, by Paula Newman and Stuart Card, included by reference hereinabove. The control routine then moves to box 2960 where it finds the cluster represented in the first row of the basic layout, and determines its width, in terms of basic layout columns, and then moves to box 2980. At box 2980, described in detail with respect to FIG. 31, the control routine builds the outline treetable for the cluster, and, recursively, all its descendant clusters. The control routine then moves to box 2990 where it returns the outline treetable.

Figure 30:
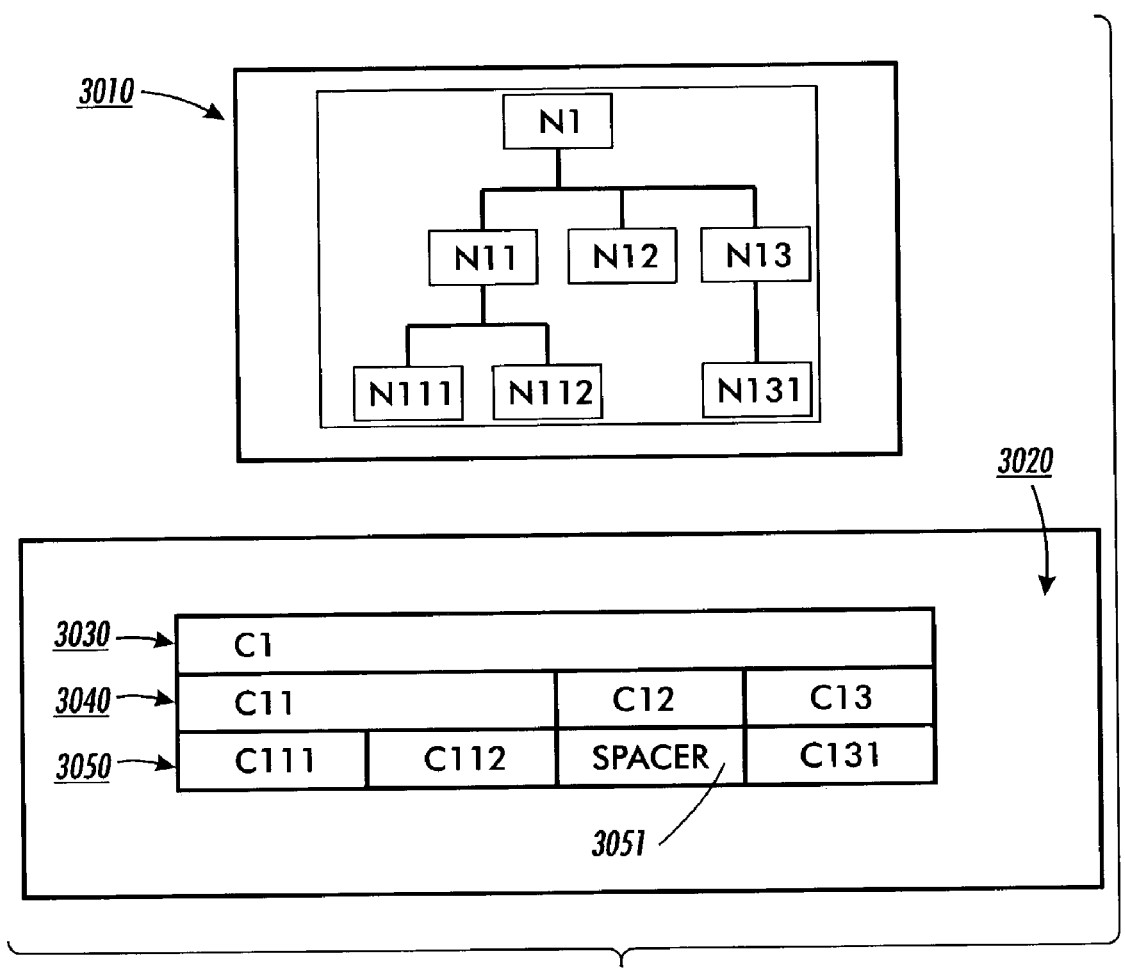
FIG. 30 is an illustration of the correspondence between a tree and a basic treetable layout.

FIG. 30 illustrates the correspondence between a tree and its associated basic treetable layout. Tree 3010 contains nodes N1, N11, N12, N13, N111, N112, and N131. The associated treetable layout 3020 contains rows 3030, 3040, and 3050, each made up of a sequence of cells and associated widths, and each cell either represents a tree node or is a spacer cell. The cells are constructed so that, when translated into display specifications, each cell representing a parent exactly spans the cells representing its children. To accomplish this, cells representing parents are given widths equal to the number of their descendant leaves, leaf cells are given width 1, and spacer cells are inserted. Thus row 3030 contains one cell C1, corresponding to the root node N1, and has width of 4 leaf cells. Row 3040 contains three cells C11, C12, and C13, corresponding to the nodes N11, N12, and N13 respectively. Cell C11 is of width 2, while the others are of width 1. Row 3050 contains four cells. The first two cells C111 and C112 correspond to the leaf nodes correspond to leaf nodes N111 and N112, and are each of width 1. The third cell 3051 is a spacer cell of width 1, ensuring that the fourth cell C131, corresponding to leaf node N131, appears underneath the cell C13 representing its parent node N13.

Figure 31:
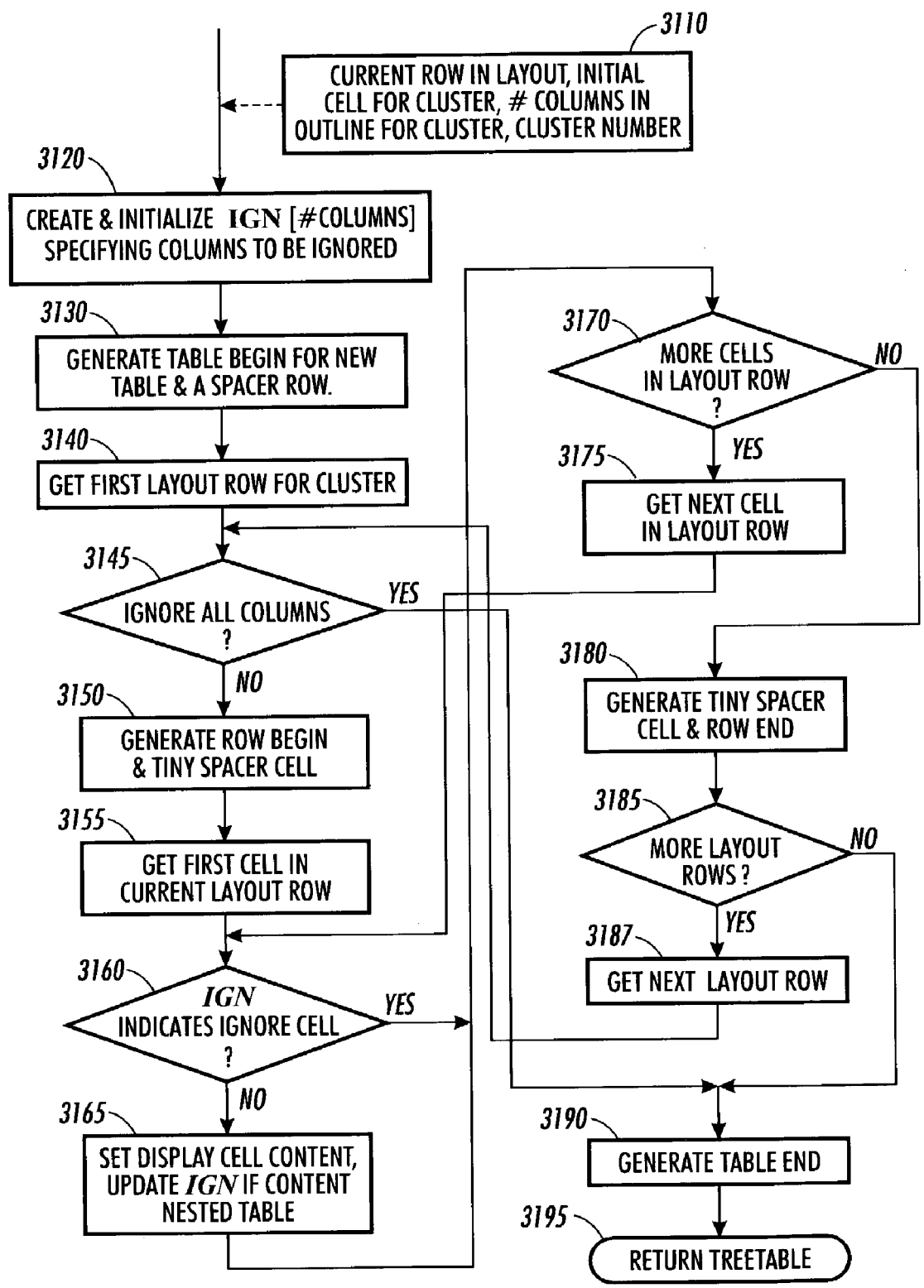
FIG. 31 is a flow diagram of the method of building an outline treetable for a cluster, containing nested outline treetables
Figure 32:
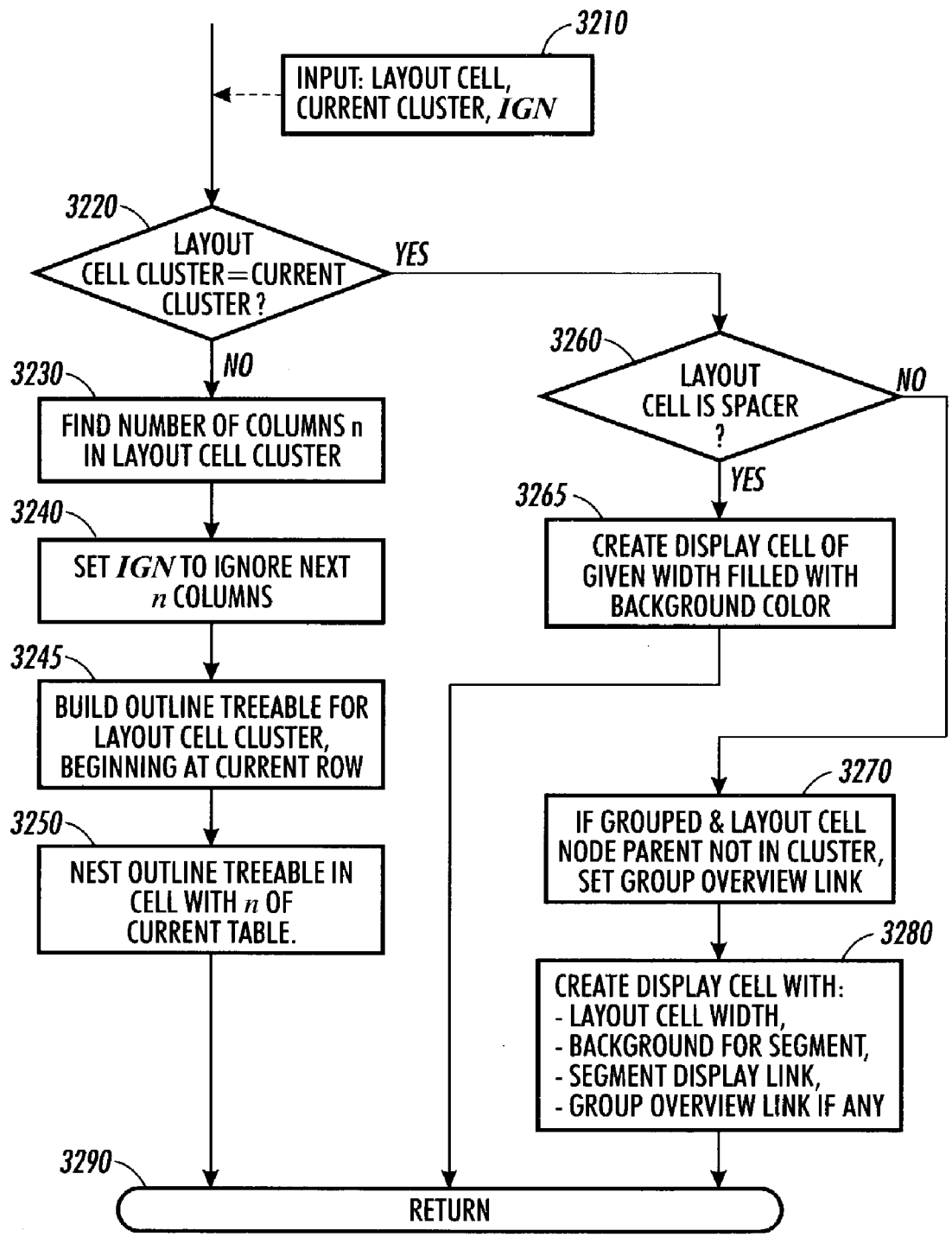
FIG. 32 is a flow diagram of the method for filling a display cell in an outline treetable While the present invention will be described in connection with a preferred embodiment and/or method of use, it will be understood that it is not intended to limit the invention to that embodiment and procedure. On the contrary, it is intended to cover all alternatives, modifications and equivalents as may be included within the spirit and scope of the invention as defined by the appended claims.

FIGS. 31 and 32 describe the method of building an outline treetable for a cluster and recursively building and incorporating outline treetables for all its descendant clusters. FIG. 31, detailing box 2980 of FIG. 29, and box 3245 of FIG. 32, describes the overall process for each cluster. Input to the process is represented by box 3110, and includes the cluster number for which the treetable is to be built, the first layout row containing cells associated with the cluster, the index of the first such cell, and the number of columns occupied by the cluster in the current layout row (which is equal to the total width of the cluster and its descendants). The control routine enters at box 3120 where it creates an ignore vector IGN containing one position for each column in the basic layout, and initializes it to specify that all columns before and after the columns spanned by the cluster, and therefore cells in the outline layout spanning such columns, are to be ignored. The control routine then moves to box 3130 where it generates a table begin indication suitable to the assumed display processor, and then. a row of one or more shallow cells, whose combined actual width is the same as the combined width of the columns of the cluster, to serve as a horizontal border for the cells of the region representing the cluster. The control routine then moves to box 3140 where it gets the first row of the layout containing cells in the cluster, and then moves to decision box 3145. At decision box 3145 the control routine inspects the ignore vector IGN to determine whether all columns are to be ignored, meaning that in all further rows of the layout, the cells will be filled within another table. If so, the control routine moves to box 3190. Otherwise the control routine proceeds to box 3150 where it generates a row begin and a small spacer cell to serve as a region delineator, and moves to box 3155. At box 3155 it gets the first cell in the current layout row and moves to decision box 3160. At decision box 3160 the control routine checks whether the first column occupied by the cell is to be ignored (in which case the entire cell is ignored). If so, the control routine moves to decision box 3170. Otherwise the control routine moves to box 3165, described in detail with respect to FIG. 32, where it produces a display cell, and, if the display cell is filled with a nested cluster treetable, sets ignore vector IGN to ignore all columns spanned by that descendant treetable. The control routine then moves to decision box 3170.

At box 3170 the control routine checks if there are more cells in the current row of the layout. If so, it moves to box 3175 where it gets the next cell in the current row and moves to box 3160. Otherwise, it moves to box 3180 where it generates a tiny spacer cell representing part of the vertical margin for the region, and a row-end indicator, and moves to decision box 3185. At decision box 3185 the control routine checks whether there are any more rows in the layout after the current row. If not, it moves to box 3190 where it generates a table end indicator and then to box 3195. If, however, at decision box 3185 the control routine determines that there are more rows in the layout, it moves to box 3187 where it gets the next outline row, and then to box 3150.

At box 3195 the control routine returns the nested treetable for the cluster.

FIG. 32, which details box 3165 of FIG. 31, describes the method for filling a single cell of a treetable. The cell may be filled with a spacer cell having the overall table background, a cell representing a node within the cluster, or a cell containing an entire nested table representing a descendant cluster, in which case the process of FIG. 31 is used recursively. Box 3210 represents the input to the process, which includes the layout cell to be used in filling the table cell, the current cluster, and the current content of the ignore vector IGN for the current treatable. The control routine enters at decision box 3220 where it checks whether the input layout cell is associated with the current cluster. If not, it moves to box 3230, where it finds the column count cc of columns that will be covered by the treetable associated with the layout cell cluster (Note: there may be several consecutive cells in the layout row representing the same cluster). The control routine then moves to box 3240 where it sets the ignore vector IGN to also ignore those columns, and then moves to box 3245.

At box 3245, described in detail with respect to FIG. 31, the control routine recursively constructs an outline treetable for the layout cell cluster, and moves to box 3250. At box 3250 the control routine adds a cell to the current treetable whose width equals the column count cc, and which contains the recursively constructed outline treetable and moves to box 3290.

If, however, at decision box 3220 the control routine finds that the input layout cell is associated with the current cluster, it moves to box 3260. At box 3260 the control routine checks whether the input layout cell is a spacer cell, that is, one representing part of the empty space in the treetable. If so, it moves to box 3265 where it fills a table cell having the same width as that of the layout cell with the table background, and moves to box 3290. However, if at decision box 3260 the control routine finds that the layout cell is not a spacer cell, it moves to box 3170. At box 3170, if the tree has been clustered and the outline layout cell is in the first row of the treetable representing the cluster, the control routine indicates that a link to an overview segment for the cluster is to be inserted into the new cell, and then the control routine moves to box 3280. At box 3280 the control routine produces a new treetable cell having the same width in columns as the input layout cell, a background that has been identified for the segment associated with the layout cell, a labeled link to the detail segment treetable for the segment and, if a link to an overview segment is to be inserted, a labeled link to the overview as well. The control routine then moves to box 3290.

At box 3290 the control routine returns.

The invention claimed is:

1. A method for clustering hierarchically related information, where the information can be represented as a set of nodes wherein each node is associated with a portion of the information and the nodes are connected by directed edges wherein a parent node is the source of an incoming edge, a child node is the target of an outgoing edge, sibling nodes have the same parent node, and a path is a sequence of nodes, comprising:
   a) associating a cluster having a size with each node,
   b) identifying related node pairs,
   c) determining a node distance for each node pair,
   d) determining if there is more than one cluster remaining,
   e) responsive to the determination in step d, selecting a pair of clusters to combine and determining their cluster distance, f) determining whether the cluster distance of the selected cluster pair is less than a maximum distance and whether the sum of the sizes of the two clusters of the selected cluster pair is less than a specified halting cluster size, g) responsive to the determination in step f, combining the selected cluster pair into a combined cluster and associating the combined cluster with each of the nodes previously associated with each of the individual clusters in the selected cluster pair, and h) repeating steps e, f, and g until the selected cluster pair has a cluster distance greater than a maximum distance or the sum of the sizes of the two clusters of the cluster pair is greater than a specified halting cluster size.

2. The method in claim 1 wherein the information associated with each node represents text of an electronic mail message.

3. The method of claim 2 further comprising: modifying the information by normalizing the quoting styles of each electronic mail message prior to the step of determining a node distance for each node pair.

4. The method of claim 1 wherein determining a node distance for each node pair comprises
   a) determining a word vector for each node based on the portion of the information represented by that node, and
   b) determining the node distance based on the distance between the word vectors.

5. The method of claim 1 wherein identifying related node pairs comprises identifying nodes related along a path.

6. The method of claim 1 wherein identifying related node pairs comprises identifying node pairs related in a parent child relation.

7. The method of claim 1 wherein identifying related node pairs comprises identifying node pairs related in a sibling relation.

8. The method of claim 1 wherein selecting a pair of clusters to combine and determining their cluster distance comprises:
   a) determining a cluster distance for each pair of clusters wherein a first cluster is associated with the first node of a node pair and a second cluster is associated with the second node of a node pair, from the node distances of all node pairs linking each cluster in the pair of clusters, and a centroid distance between the two clusters in the pair of clusters.
   b) determining which pair of clusters has the smallest cluster distance, and
   c) selecting the pair of clusters having the smallest distance.

9. The method of claim 8 wherein computing a centroid distance between two clusters comprises finding a lexical centroid for each cluster and then determining a distance between the two lexical centroids.

10. The method of claim 1 wherein selecting a pair of clusters to combine and determining their cluster distance comprises:
    a) determining a cluster distance for each pair of clusters wherein a first cluster is associated with the first node of a node pair and a second cluster is associated with the second node of a node pair, from the minimum node distance of all node pairs linking each cluster in the pair of clusters, and a centroid distance between the two clusters in the pair of clusters,
    b) determining which pair of clusters has the smallest cluster distance, and
    c) selecting the pair of clusters having the smallest distance.

11. The method of claim 1 wherein selecting a pair of clusters to combine and determining their cluster distance comprises
    a) selecting the node pair with the smallest node distance whose members are in two different clusters,
    b) selecting the two clusters associated with the nodes of the selected node pair, and setting the cluster distance as the node distance of the selected node pair.

12. The method of claim 1 further comprising after step h:
    i) determining whether the selected cluster pair has a cluster distance less than the maximum distance and a cluster size less than a specified maximum cluster size, and
    j) responsive to the determination in step j, combining the selected cluster pair into a combined cluster and associating the combined cluster with each of the nodes previously associated with each of the individual clusters in the selected cluster pair.

13. The method of claim 1 further comprising after step h:
    a) designating clusters larger than a given size as primary clusters and clusters smaller than a given size as secondary clusters, and
    b) combining adjacent secondary clusters.

14. The method of claim 13 further comprising combining any secondary clusters smaller than a given size with an adjacent primary cluster.

15. The method of claim 1 wherein selecting a pair of clusters to combine and determining their cluster distance comprises:
    a) determining a cluster distance for each pair of clusters wherein a first cluster is associated with the first node of a node pair and a second cluster is associated with the second node of a node pair, from the largest node distance of all node pairs linking each cluster in the pair of clusters, and a centroid distance between the two clusters in the pair of clusters,
    b) determining which pair of clusters has the smallest cluster distance, and
    c) selecting the pair of clusters having the smallest distance.

* * * * *